(12) United States Patent
De Freitas Cunha et al.

(10) Patent No.: US 12,527,246 B2
(45) Date of Patent: Jan. 20, 2026

(54) DEEP LEARNING SYSTEM AND METHOD FOR PREDICTING CROP CHARACTERISTICS

(71) Applicant: MICROSOFT TECHNOLOGY LICENSING, LLC, Redmond, WA (US)

(72) Inventors: Renato Luiz De Freitas Cunha, Sao Paulo (BR); Anirudh Badam, Issaquah, WA (US); Patrick Bernd Buehler, Boston, MA (US); Ranveer Chandra, Kirkland, WA (US); Debasis Dan, Hyderabad (IN); Maria Angels de Luis Blaguer, Redmond, WA (US); Swati Sharma, Hayward, CA (US); Fnu Aditi, Palo Alto, CA (US); Sara Malvar Maua, Sao Paulo (BR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 500 days.

(21) Appl. No.: 18/056,677

(22) Filed: Nov. 17, 2022

(65) Prior Publication Data

US 2023/0389460 A1 Dec. 7, 2023

(30) Foreign Application Priority Data

Jun. 3, 2022 (IN) .............................. 202241031818

(51) Int. Cl.
*A01B 79/00* (2006.01)
*A01B 79/02* (2006.01)
(Continued)

(52) U.S. Cl.
CPC ............ *A01B 79/005* (2013.01); *A01B 79/02* (2013.01); *G01W 1/02* (2013.01); *G01W 1/14* (2013.01); *G06N 3/045* (2023.01); *G06N 3/08* (2013.01)

(58) Field of Classification Search
CPC ..... A01B 79/005; A01B 79/02; A01B 69/008; G01W 1/02; G01W 1/14; G01W 2201/00;
(Continued)

(56) References Cited

U.S. PATENT DOCUMENTS

2020/0134486 A1* 4/2020 Jiang ...................... G06N 20/10

FOREIGN PATENT DOCUMENTS

| CA | 3120370 A1 * | 6/2020 | ........... A01B 79/005 |
| CA | 3121647 A1 * | 7/2020 | ............. A01C 21/00 |
| CN | 114639446 B * | 3/2024 | ............. G06N 3/045 |

OTHER PUBLICATIONS

Zhu, et al., "Genetic Diversity and Genome-Wide Association Study of Major Ear Quantitative Traits Using High-Density SNPs in Maize", In Journal of Frontiers in Plant Science, vol. 9, Jul. 9, 2018, 16 Pages.
(Continued)

*Primary Examiner* — Jeffrey P Aiello
(74) *Attorney, Agent, or Firm* — Benjamin Keim; Newport IP, LLC

(57) ABSTRACT

A deep learning system is used to predict crop characteristics from inputs that include crop variety features, environmental features, and field management features. The deep learning system includes domain-specific modules for each category of features. Some of the domain-specific modules are implemented as convolutional neural networks (CNN) while others are implemented as fully-connected neural networks. Interactions between different domains are captured with cross attention between respective embeddings. Embed-
(Continued)

dings from the multiple domain-specific modules are concatenated to create a deep neural network (DNN). The prediction generated by the DNN is a characteristic of the crop such as yield, height, or disease resistance. The DNN can be used to select a crop variety for planting in a field. For a crop that is planted, the DNN may be used to select a field management technique.

19 Claims, 12 Drawing Sheets

(51) Int. Cl.
| | |
|---|---|
| G01W 1/02 | (2006.01) |
| G01W 1/14 | (2006.01) |
| G06N 3/04 | (2023.01) |
| G06N 3/045 | (2023.01) |
| G06N 3/08 | (2023.01) |

(58) Field of Classification Search
CPC . G01W 2203/00; G06N 3/045; G06N 3/0464; G06N 3/048; G06N 3/08; G06N 3/09; G06N 3/04; G06N 3/088; G06N 3/02; G06N 3/042; G06N 3/126; G06N 3/043; G06N 20/00; G06F 18/214; G06F 18/24; G06F 30/27; A01C 21/007
USPC ...... 702/2, 19, 188, 3, 183, 189; 706/25, 15, 706/12, 20, 21, 16, 45, 904
See application file for complete search history.

(56) References Cited

OTHER PUBLICATIONS

"International Search Report and Written Opinion Issued in PCT Application No. PCT/US23/021608", Mailed Date: Aug. 7, 2023, 13 Pages.
"B73 RefGen_v2", Retrieved from: https://www.ncbi.nlm.nih.gov/assembly/GCA_000005005.4/, Nov. 14, 2012, 2 Pages.
"Corn Growing Degree Days (GDD)", Retrieved from: https://web.archive.org/web/20220319091351/https://ndawn.ndsu.nodak.edu/help-corn-growing-degree-days.html, Mar. 19, 2022, 4 Pages.
"Daymet: Daily Surface Weather Data on a 1-km Grid for North America, Version 4", Retrieved from: https://daac.ornl.gov/DAYMET/guides/Daymet_Daily_V4.html, Apr. 7, 2022, 6 Pages.
"Repurposing Food and Agricultural Policies to make Healthy Diets more Affordable", Published in The State of Food Security and Nutrition in the World, Oct. 20, 2022, 260 Pages.
"Sklearn.Feature_Selection.Mutual_info_Classif", Retrieved from: https://scikit-learn.org/stable/modules/generated/sklearn.feature_selection.mutual_info_classif.html, Retrieved on: Nov. 14, 2022, 1 page.
"Sklearn.Feature_Selection.RFE", Retrieved from: https://web.archive.org/web/20221102112227/https://scikit-learn.org/stable/modules/generated/sklearn.feature_selection.RFE.html, Nov. 2, 2022, 9 Pages.
"Sklearn.Preprocessing.StandardScaler", Retrieved from: https://scikit-learn.org/stable/modules/generated/sklearn.preprocessing.StandardScaler.html, Retrieved on: Nov. 14, 2022, 20 Pages.
"The Future of Food and Agriculture", Retrieved from: https://web.archive.org/web/20220703195235/https://www.fao.org/3/i6583e/i6583e.pdf, Jul. 3, 2022, 180 Pages.
"The Genomes to Fields (G2F) Initiative", Retrieved from: https://web.archive.org/web/20221104154159/http://www.genomes2fields.org/home/, Nov. 4, 2022, 8 Pages.
"Vapor Pressure", Retrieved from: https://web.archive.org/web/20170215054015/https://www.weather.gov/media/epz/wxcalc/vaporPressure.pdf, Feb. 15, 2017, 1 Page.
"Welcome to LightGBM's Documentation!", Retrieved from: https://web.archive.org/web/20220118172932/https://lightgbm.readthedocs.io/en/v3.3.2/, Jan. 18, 2022, 2 Pages.
Afroz, et al., "Best Management Practices for Sustaining Agricultural Production at Choctawhatchee Watershed in Alabama, USA, in Response to Climate Change", In Journal of Air, Soil and Water Research, vol. 14, Feb. 15, 2021, 12 Pages.
Altieri, et al., "The Adaptation and Mitigation Potential of Traditional Agriculture in a Changing Climate", In Journal of Climatic Change, vol. 140, Sep. 13, 2013, pp. 33-45.
Aubert, et al., "IT as Enabler of Sustainable Farming: An Empirical Analysis of Farmers' Adoption Decision of Precision Agriculture Technology", In Journal of Decision Support Systems, vol. 54, Issue 1, Dec. 1, 2012, 32 Pages.
Berry, et al., "Precision Conservation for Environmental Sustainability", In Journal of Soil and Water Conservation, vol. 58, Issue 6, Nov. 1, 2003, pp. 332-339.
Bongiovanni, et al., "Precision Agriculture and Sustainability", In Journal of Precision Agriculture, vol. 5, Issue 4, Aug. 1, 2004, pp. 359-387.
Cooper, et al., "Tackling G×E×M Interactions to Close on-Farm Yield-Gaps: Creating Novel Pathways for Crop Improvement by Predicting Contributions of Genetics and Management to Crop Productivity", In Journal of Theoretical and Applied Genetics, vol. 134, Issue 6, Mar. 18, 2021, pp. 1625-1644.
Crossa, et al., "Genomic Prediction in Maize Breeding Populations with Genotyping-by-Sequencing", In Journal of G3: Genes, Genomes, Genetics, vol. 3, Issue 11, Nov. 1, 2013, pp. 1903-1926.
Cui, et al., "Multi-Scale Convolutional Neural Networks for Time Series Classification", In Repository of arXiv:1603.06995v1, Mar. 22, 2016, 10 Pages.
Delgado, et al., "Big Data Analysis for Sustainable Agriculture on a Geospatial Cloud Framework", In Journal of Frontiers in Sustainable Food Systems, vol. 3, Article 54, Jul. 16, 2019, 13 Pages.
Gaffney, et al., "Industry-Scale Evaluation of Maize Hybrids Selected for Increased Yield in Drought-Stress Conditions of the US Corn Belt", In Journal of Crop Science, vol. 55, Issue 4, Jul. 1, 2015, pp. 1608-1618.
Heffner, et al., "Genomic Selection for Crop Improvement", In Journal of Crop Science, vol. 49, Issue 1, Jan. 1, 2009, 12 Pages.
Henderson, C. R., "Best Linear Unbiased Estimation and Prediction under a Selection Model", In Journal of Biometrics, vol. 31, Issue 2, Jun. 1975, pp. 423-447.
Holzworth, et al., "APSIM—Evolution Towards a New Generation of Agricultural Systems Simulation", In Journal of Environmental Modelling & Software, vol. 62, Dec. 2014, 24 Pages.
Holzworth, et al., "APSIM Next Generation: Overcoming challenges in modernising a farming systems model", In Journal of Environmental Modelling & Software, vol. 103, May 2018, pp. 43-51.
Hunter, et al., "Agriculture in 2050: Recalibrating Targets for Sustainable Intensification", In Journal of BioScience, vol. 67, Issue 4, Apr. 2017, pp. 386-391.
Jakhar, et al., "Nano-Fertilizers: A Sustainable Technology for Improving Crop Nutrition and Food Security", In Journal of NanoImpact, vol. 27, Jul. 6, 2022, 19 Pages.
Jarquin, et al., "Utility of Climatic Information via Combining Ability Models to Improve Genomic Prediction for Yield Within the Genomes to Fields Maize Project", In Journal of Frontiers in Genetics, vol. 11, Mar. 8, 2021, 11 Pages.
Jubair, et al., "GPTransformer: A Transformer-Based Deep Learning Method for Predicting Fusarium Related Traits in Barley", In Journal of Frontiers in Plant Science, vol. 12, Dec. 16, 2021, 14 Pages.
Keating, et al., "An Overview of APSIM, A Model Designed for Farming Systems Simulation", In European Journal of Agronomy, vol. 18, Issue 3-4, Jan. 2003, pp. 267-288.
Khanal, et al., "An Overview of Current and Potential Applications of Thermal Remote Sensing in Precision Agriculture", In Journal of Computers and Electronics in Agriculture, vol. 139, Jun. 15, 2017, pp. 22-32.

(56) References Cited

OTHER PUBLICATIONS

Kick, et al., "Yield Prediction Through Integration of Genetic, Environment, and Management Data Through Deep Learning", In Journal of BioRxiv, Jan. 2022, 51 Pages.

Lesk, et al., "Influence of extreme weather disasters on global crop production", In Journal of Nature, vol. 529, Issue 7584, Jan. 7, 2016, pp. 84-87.

Li, et al., "An Integrated Framework Reinstating the Environmental Dimension for GWAS and Genomic Selection in Crops", In Journal of Molecular Plant, vol. 14, Issue 6, Jun. 7, 2021, pp. 874-887.

Liu, et al., "Phenotype Prediction and Genome-Wide Association Study Using Deep Convolutional Neural Network of Soybean", In Journal of Frontiers in Genetics, vol. 10, Nov. 22, 2019, 10 Pages.

Maaten, et al., "Visualizing Data using t-SNE", In Journal of Machine Learning Research, vol. 9, Issue 11, Nov. 2008, pp. 2579-2605.

Meuwissen, et al., "Genomic Selection: A Paradigm Shift in Animal Breeding", In Journal of Animal Frontiers, vol. 6, Issue 1, Jan. 2016, pp. 6-14.

Pierpaolia, et al., "Drivers of Precision Agriculture Technologies Adoption: A Literature Review", In Journal of Procedia Technology, vol. 8, Jan. 2013, pp. 61-69.

Rogers, et al., "The Importance of Dominance and Genotype-by-Environment Interactions on Grain Yield Variation in a Large-Scale Public Cooperative Maize Experiment", In Journal of G3: Genes, Genomes, Genetics, vol. 11, Issue 2, Jan. 4, 2021, 17 Pages.

Rosegrant, et al., "Global Food Security: Challenges and Policies", In Journal of Science, vol. 302, Issue 5652, Dec. 12, 2003, pp. 1917-1919.

Sengwayo, et al., "Location and Crop-Year Effects on Sugarcane Genotype Performance for the Coastal Short Cycle Breeding Programmes in South Africa", In South African Journal of Plant and Soil, vol. 35, Issue 2, Sep. 14, 2017, 9 Pages.

Tan, et al., "LXMERT: Learning Cross-Modality Encoder Representations from Transformers", In Repository of arXiv:1908.07490v1, Aug. 20, 2019, 12 Pages.

Technow, et al., "Integrating Crop Growth Models with Whole Genome Prediction through Approximate Bayesian Computation", In Journal of PLOS one, vol. 10, Issue 6, Jun. 29, 2015, 20 Pages.

Vaswani, et al., "Attention is All You Need", In Repository of arXiv:1706.03762v1, Jun. 12, 2017, 15 Pages.

Washburn, et al., "Predicting Phenotypes from Genetic, Environment, Management, and Historical Data using CNNs", In Journal of Theoretical and Applied Genetics, vol. 134, Issue 12, Aug. 27, 2021, pp. 3997-4011.

Westhues, et al., "learnMET: An R Package to Apply Machine Learning Methods for Genomic Prediction using Multi-Environment Trial Data", In Journal of BioRxiv, Dec. 15, 2021, 12 Pages.

Zampieri, et al., "Wheat Yield Loss Attributable to Heat Waves, Drought and Water Excess at the Global, National and Subnational Scales", In Journal of Environmental Research Letters, vol. 12, Issue 6, Jun. 5, 2017, 11 Pages.

Zeng, et al., "G2PDeep: A Web-Based Deep-Learning Framework for Quantitative Phenotype Prediction and Discovery of Genomic Markers", In Journal of Nucleic Acids Research, vol. 49, May 25, 2021, pp. W228-W236.

Zhang, et al., "Precision Agriculture—A Worldwide Overview", In Journal of Computers and Electronics in Agriculture, vol. 36, Issue 2-3, Nov. 1, 2002, pp. 113-132.

Zuk, et al., "The Mystery of Missing Heritability: Genetic Interactions Create Phantom Heritability", In Proceedings of the National Academy of Sciences, vol. 109, Issue 4, Jan. 24, 2012, pp. 1193-1198.

\* cited by examiner

DEEP LEARNING SYSTEM AND METHOD FOR PREDICTING CROP CHARACTERISTICS

PRIORITY APPLICATION

This application claims the benefit of and priority to Indian Provisional Application No. 202241031818, filed Jun. 3, 2022, the entire contents of which are incorporated herein by reference.

BACKGROUND

The human population is expected to reach 9.7 billion by 2050, based on current trends. Meeting the demand for food, fuel, fiber, and feed for this growing population will require increasing crop production by 25-75%. However, there is a limited amount of arable land, and water levels are also receding in many areas. Additionally, this increase in production needs to happen while adapting agricultural practices to changing climates due to global warming.

Existing techniques to produce new crop varieties can take 10-15 years. This may be too slow given the rapid increase in demand and rate of climate change. Precision agriculture can be used to optimize selected characteristics of crops on a field-by-field basis. Precision agriculture is a management strategy that uses a suite of advanced information, communication and data analysis techniques, remote sensing, Geographical Information Systems (GIS), and computer models to make agricultural decisions. However, there is still only a limited understanding of how different aspects of agriculture affect crop yield. Traditional models based on mechanistic or statistical approaches do not capture all of the complex interactions between crop varieties, the environment, and field management practices. New techniques in precision agriculture to improve crop productivity may help address these challenges.

SUMMARY

This disclosure provides techniques and systems that use neural networks and deep learning to identify crop varieties for planting in a particular field. These techniques can also be used for adapting field management techniques for a given crop. Selecting the best variety of a crop to plant in a field and optimizing field management can address the world's growing demand for food and other crops. The techniques of this disclosure provide a way to forecast crop productivity and explore what-if scenarios to determine how changes in crop varieties, environment, and field management impact specific crop characteristics. These predictions can guide agricultural decisions and increase crop productivity.

This disclosure describes the use of a Natural Language Processing (NLP)-based neural network architecture that takes crop varieties, environmental factors, and field management techniques as inputs and models their interactions to generate predictions about a crop characteristic. Deep neural networks (DNNs) are trained on data that includes multiple varieties of a crop species, environmental factors such as weather and soil, and field management practices such as irrigation and use of fertilizer. Each category of input is processed through a separate domain-specialized model that uses a neural network to create an embedding. The domains can be independently constructed from different types of neural networks such as convolutional neural networks or fully connected neural networks.

Interactions between multiple domains (e.g., crop variety and weather) are captured with multi-modal cross attention using techniques adapted from NLP. The separate embeddings are then fused into a single, DNN. The DNN predicts a crop characteristic such as yield, plant height, or disease resistance based on specific inputs to the trained models. The DNN may be used to identify a crop variety best suited to a specific field. The neural network may also be used to identify optimal field management techniques (e.g., irrigation and fertilizer) to use for a crop that is already planted. Moreover, the output of the DNN may guide field management and crop selection in response to climate change.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
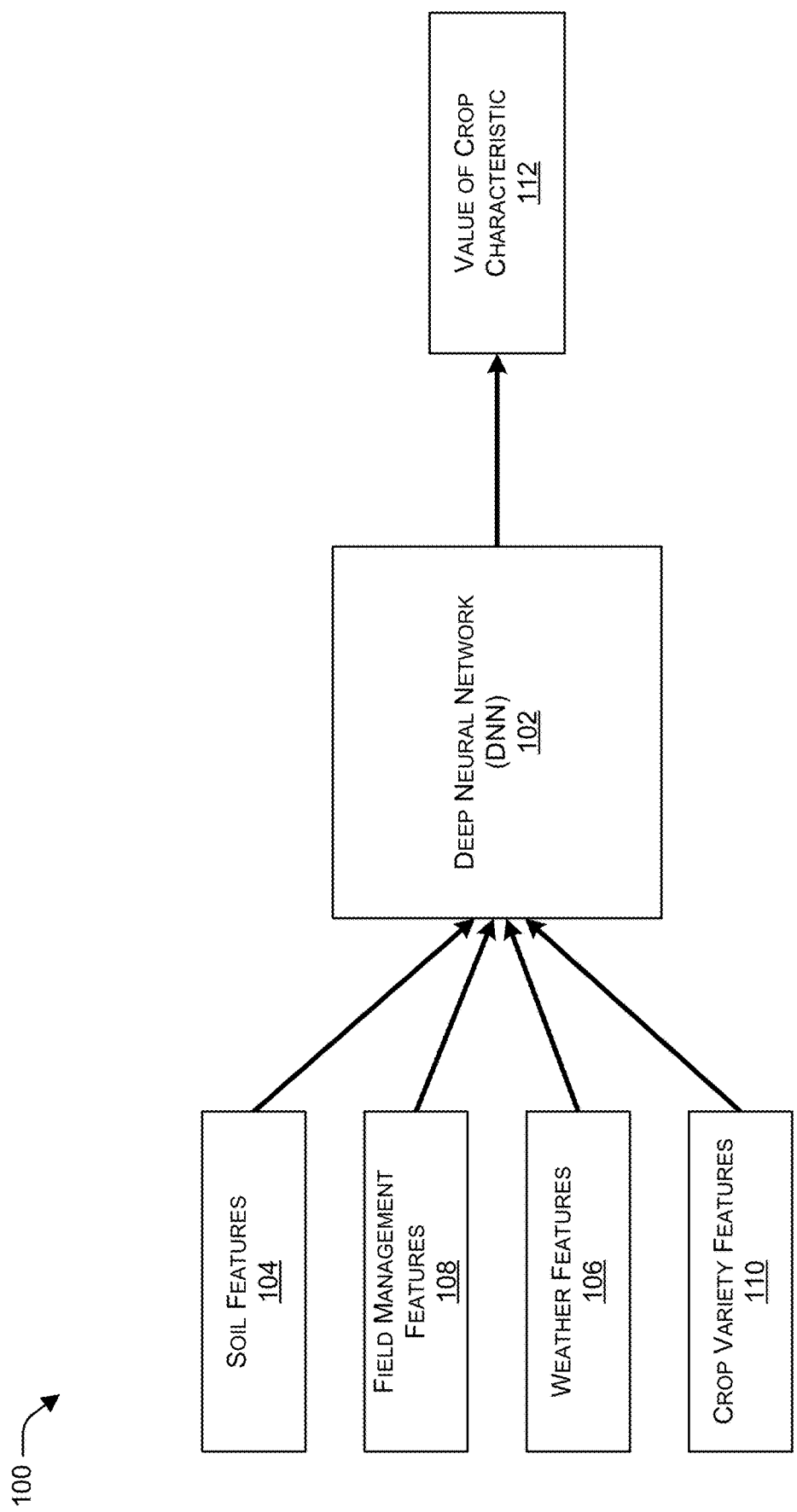
FIG. 1 is a schematic diagram that illustrates use of a DNN to predict the value of a crop characteristic.

The deep learning systems and methods of this disclosure take advantage of recent advances in machine learning to provide improved predictions of crop characteristics which are then used to guide precision agriculture. The systems and methods of this disclosure may be used with any type of agricultural crop including food crops and non-food crops. The core of this deep learning system is a DNN trained on a concatenation of embeddings generated by multiple domain-specific neural networks. The broad categories of inputs used are genomics (G), environment (E), and field management practices (M).

Genomics (G) represents the genome of the crop variety and captures differences between varieties of the same species. One way to represent genomics is by single nucleotide polymorphisms (SNPs) that identify locations in the genome that differ from a reference genome. An SNP is a germline substitution of a single nucleotide at a specific position in the genome. Environment (E) refers to environmental conditions such as weather and soil. Field management practices (M) are all the different ways that the crop and field can be managed such as irrigation and use of fertilizer. The output of the DNN is a predicted value for a crop phenotype. Crop phenotype refers to any observable or measurable characteristics of a crop such as, but not limited to grain yield, protein content, moisture content, fiber content, height, drought resistance, molecular or metabolic characteristic, and disease resistance.

Selection of specific crops or crop varieties for planting has previously been done using the intuition and knowledge of agronomists and breeders or by inflexible models that do not generalize. Agronomists can use germplasm libraries to create new hybrids that are then tested in the field. Varieties with favorable phenotypes are selected. However, in many instances only a few varieties, such as two or three, out of a hundred tested have favorable phenotypes. Thus, selection by an agronomist often has a low rate of success. Given the increasing speed at which climate conditions are changing, farmers may need new varieties of seeds faster than they can be developed by agronomists. The deep learning model of this disclosure can be used to identify varieties of a crop to test in the field with a greater rate of success than agronomists.

Existing models, typically inflexible linear models, may work reasonably well for specific crops and specific regions but do not generalize to other crops and may not be able to account for changes in the climate. These models often make over-simplifying assumptions about the interaction of crop genetics, the environment, and field management techniques. Use of these models may also require specialized datasets from controlled environments. This data is difficult to collect and makes some models hard to scale. Because many existing models are inflexible, accounting for different environmental conditions or new crop varieties may require the time-consuming work of creating an entirely new model.

An additional challenge for modeling crop characteristics is the difficulty and cost of collecting data. Collection of fine-grained data can require installing multiple sensors in a field and constantly monitoring the sensors through the growing season. This makes data collection expensive and limits the practical data density. Thus, the data available for precision agriculture may be sparse and imprecise. There is a very large number of combinations of factors due to combinatorial explosions that makes it impractical to collect data for more than a small percentage of the possible combinations of genes, soil, weather, and field management technique.

The sparsity of the data creates challenges in designing a model that is robust enough to provide accurate predictions in the absence of abundant high-quality data. This is less of a problem in other applications for neural networks such as machine vision where detailed and labeled datasets are abundant. These challenges can be addressed by a model design that can learn interrelationships between various inputs from a sparse data set. Because precision agriculture often deals with sparse data sets, brute force techniques may have limited usefulness without some insight into model design. Given this, it is difficult to know in advance what type of deep learning model architecture will successfully predict crop characteristics.

The way a gene affects the phenotype depends on intra-genome context—the other genes. The effect any gene has on the phenotype of a plant is influenced by other genes in ways that are poorly understood and difficult to predict. This is referred to as intra-genome effects. Individual genes also affect the phenotype of a developing plant differently depending on the conditions experienced by that plant. The influence of the environment on how a gene affects phenotype is referred to as extra-genome effects. This extra-genome context includes the environment and field management techniques. So, the "meaning" or phenotype of a genomic "sentence" is predicted by a deep learning model given the context which includes both the intra-genome effects and the extra-genome effects.

The recognition of similarities between genes in a genome and natural language allows work in NLP to be used for building neural networks to predict crop phenotypes. Models properly adapted from NLP can capture the complex interrelationship between genetic variations, the environment, and field management. The ability of NLP models to deal with sparse data allows for successful use of real-world data for training without strict requirements for the amount or type of data.

Although deep learning models can address many shortcomings of linear models there are also challenges with implementing deep learning models. There are a large number of inputs that could be provided to a precision agriculture model such as detailed genomic sequences, months or years of weather data, soil compositions from hundreds of different plots, and multiple variations of field management practices. A naïve implementation that attempts to incorporate all available information without thoughtful design could result in a DNN with a large network that has over a million hyperparameters. However, large models can be easily over trained and may mimic the data without generalizing to unseen data sets. Additionally, implementing a large model may require computing resources that are unavailable or impractical to use for selecting crops to plant on only a few fields.

The design of the deep learning system of this disclosure uses the concept of cross attention from NLP to capture interrelationships between different categories of inputs which increases accuracy while maintaining a small model size. Specifically, cross attention is used to capture the effects that weather combined with a crop genome has on the phenotype. Additionally, this model uses a subset of all available SNPs to capture the most useful information from the genome while limiting the model size. Thus, the DNN described herein may be implemented as a small model with about 100,000 to 200,000 hyperparameters that can fit on a single graphics processing unit (GPU).

FIG. 1 is a schematic diagram 100 that illustrates the inputs and output of the DNN 102 of this disclosure. As mentioned above, one of the inputs to the DNN 102 is environmental data which includes soil features 104 and weather features 106. The other inputs to the DNN 102 are fuel management features 108 and crop variety features 110. Each of these is explained briefly in greater detail below. Embeddings formed from these features are concatenated to create the DNN 102.

Examples of soil features 104 include the amount of nutrients in the soil, pH, amount of sand, amount of organic matter, as well as other features. Soil features 104 can be obtained by sensors in the soil or by collecting soil samples and testing the samples in a laboratory. Examples of weather features 106 include temperature, humidity, rainfall, and day length, as well as other features. Weather features 106 may be collected by weather stations that collect readings periodically (e.g., every 30 minutes) throughout the growing season. The data collected periodically may be averaged to create daily values for each feature.

The field management features 108 are field management practices that deal with soil quality and nutrient management through fertilizer application, and practices such as planting density, and irrigation. Field management features 108 can also include weed and pest management, as well as plant disease management.

The crop variety features 110 represents the genomic variations of a specific variety of crop species. The genomes of many varieties of common crops are fully sequenced. Different varieties of a crop species may be created by selective breeding and hybridization without gene manipulation. In some implementations, all the varieties of the crop exist naturally or have been used in agriculture.

There are many potential ways the genomes or genes of a specific crop variety could be represented for modeling. For example, the entirety of the sequenced genome or the genome of protein coding regions could be provided to the DNN 102. One of the challenges involved in designing this deep learning system is determining how to provide genomic information to a machine learning model.

Limitations of statistical techniques for analyzing genetic variations are addressed by modeling the genome of crop species as a natural language. Thus, inventors have developed an encoding process to convert the string of A, G, C, and T nucleotides of a genome into a string of subunits that can be analogized to words in a natural language sentence. Specifically, SNPs that affect a particular phenotype are used as words. With this encoding technique, the genome sequence of a crop species is encoded as an ordered sequence of phenotypically-relevant SNPs. This creates a "sentence" that can then be modeled by adapting NLP techniques.

The DNN 102 is trained using labeled training data. The training data may come from test plots that grow crops under controlled and carefully measured conditions. The training data may also come from other sources such as publicly available data sets. The training data, from test plots or other sources, is labeled with the value of a crop characteristics 112. The value of the crop characteristics 112 used in the training data is a phenotype of the plant at the end of the growing season. Thus, in some implementations, the DNN 102 is trained to predict a value for a single crop characteristic. For example, a first DNN 102 may be trained to predict grain yield while a second DNN 102 is trained to predict fiber content.

Soil data used for training the DNN 102 on soil features 104 may come from soil samples taken from fields and/or from an existing data set such as the Soil Survey Geographic Database (SSURGO) provided by the United States Department of Agriculture (USDA). Soil data from multiple sources may be combined to create the training data. Training data for the field management features 108 is obtained from records of past field management activity.

Data used for training the weather features 106 may come from weather stations located in fields or from a database of weather data such as the Daymet data set provided by the Oak Ridge National Laboratory. The weather features 106 are provided as a time-series of weather conditions throughout a growing season. Weather data from multiple sources may be combined to create the training data. Weather data from multiple days may be aggregated to decrease the number of steps in the time-series. For example, values for weather features may be averaged over several days to generate a single value for a multi-day window. Any number of days may be used such as 2, 3, 4, 5, 6, 7, 8, 9, 10, or more. For example, average rainfall over a 5-day window may be used as a single step in the time-series. Similarly, average day-length over a 7-day window may be used.

Training data for the crop variety features 110 is genomic data of the crop varieties. All of the crop varieties used to train the DNN 102 may be different species of the same plant. Thus, the DNN 102 may be specific to a single species of crop such as corn, wheat, or soybeans. In one implementation, the genomic data is represented as SNPs. For some crop species there may be tens or hundreds of thousands of identified SNPs. To prevent the model size from becoming excessively large, only a subset of the known SNPs may be used. The subset of SNPs used for training may be selected to include only those SNPs that have the strongest effect on the phenotype or characteristics of interest.

Once sufficiently trained, the DNN 102 may be used to predict the value of a crop characteristic 112 given when provided with soil features 104, field management features 108, weather features 106, and crop variety features 110. The inputs may be changed to see how those changes affect the predicted value for the phenotype. For example, the crop variety features 110 may be changed to compare how changing the crop varieties affects the crop characteristic 112. From this, the crop variety that produces the most desirable value for a crop characteristic 112 can be identified and planted. Similarly, multiple different combinations of field management features 108 may be compared to each other to see how different field management practices affect the crop characteristic 112. Other "what if scenarios" may also be modeled such as predicting how changes in climate, as represented by weather features 106, will affect the value of a crop characteristic 112.

The modeling may be done either before a crop is planted in the field or midway through a growing season after a crop has been planted. Once a crop is planted, the only variable that can be changed is field management. Thus, multiple field management features 108 may be compared to see how, based on weather thus far in the growing season, to manage the crop to achieve the most desirable phenotype. For example, the timing and amount of irrigation as well as fertilizer can be controlled. The deep learning model of this disclosure may be used during the growth of a crop to guide modifications of field management techniques.

The most desirable phenotype, or crop characteristic, may change during a growing season. For example, at the start of a growing season, protein content may be the characteristic that brings the highest prices. However, due to changes in commodity pricing part way through the growing season, moisture content may become the phenotype that is most desirable. In this situation, a grower may switch to using a DNN 102 trained for the crop characteristic of moisture content to identify the best field management features 108. Thus, in some implementations, a first DNN 102 may be used to determine the specific crop variety to plant and field management techniques to use at the start of the growing season. Then, part way through the growing season, a second DNN 102 may be used to identify field management techniques to optimize for a different crop characteristic. The deep learning system of this disclosure may be used for any of these or other applications.

Figure 2:
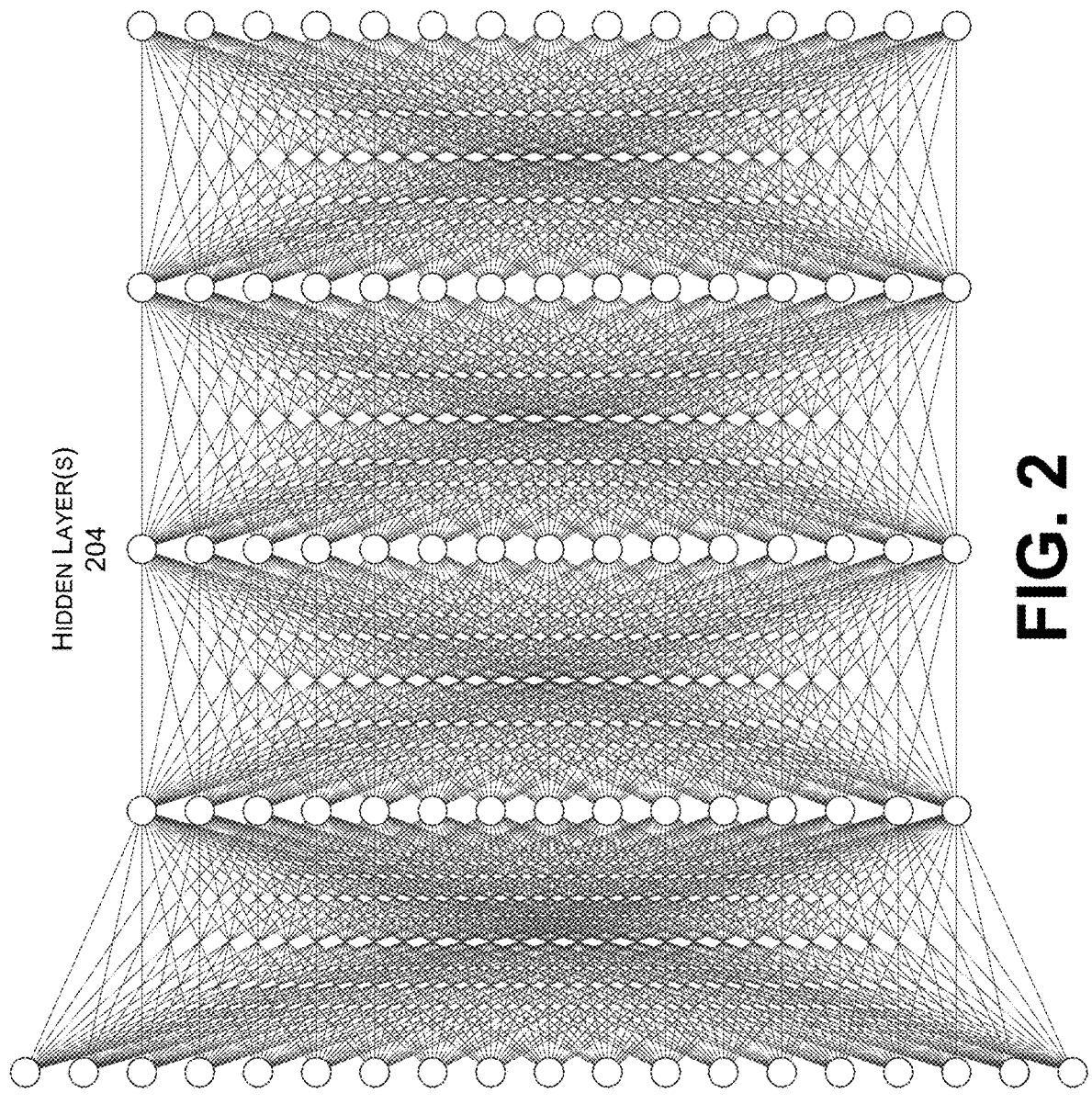
FIG. 2 is a schematic diagram of one implementation of a neural network for converting soil features to a soil embedding.

FIG. 2 is a schematic diagram of one implementation of a neural network 200 for converting soil features 104 to a soil embedding 202. In the illustrated implementation, soil embedding 202 is created by a fully connected neural network 200. However, other types of neural networks may alternatively be used.

In this example implementation, 19 different soil features 104 are captured as inputs. However, any number of features may be used as inputs such as 1, 2, 3, 4, 5, 6, 7, 8, 9, 11, 12, 13, 14, 15, 16, 17, 18, 19, 20, 21, 22, 23, 24, 25, or more. The soil features 104 may include any or all of percentage of clay, percentage of sand, percentage of silt, percentage of organic matter, calcium content, magnesium content, phosphorus content, nitrate content, potassium content, sodium content, sulfate content, pH, soil conductivity, percentage of calcium saturation, percentage of hydrogen saturation, percentage of potassium saturation, percentage of magnesium saturation, and percentage of sodium saturation. Any of the previous features may be omitted and other features not explicitly identified here may be included. Values of the soil features 104 are the input layer of the neural network 200.

The neural network 200 includes at least one hidden layer 204 and may have multiple hidden layers. In this example, the neural network 200 includes three hidden layers 204. However, it may have 1, 2, 3, 4, 5, or a greater number of hidden layers 204. In this example, each hidden layer 204 has 15 nodes; however, the hidden layers 204 may have a greater or fewer number of nodes. Each of the hidden layers 204 may have a different number of nodes than the others. The neural network 200 may be trained with any suitable activation function such as the rectified linear activation function. In this example, each node of the hidden layers 204 is a rectified linear activation unit (ReLU).

The soil embedding 202 generated by the neural network 200 in this example has a size of 15. However, the soil embedding 202 may have a different size such as 5, 6, 7, 8, 9, 10, 11, 12, 13, 14, 15, 16, 17, 18, 19, 20, or larger. Hyperparameters such as the number of hidden layers 204, and the number of nodes in each layer including in the final embedding may be determined by any suitable technique known to those of ordinary skill in the art.

Figure 3:
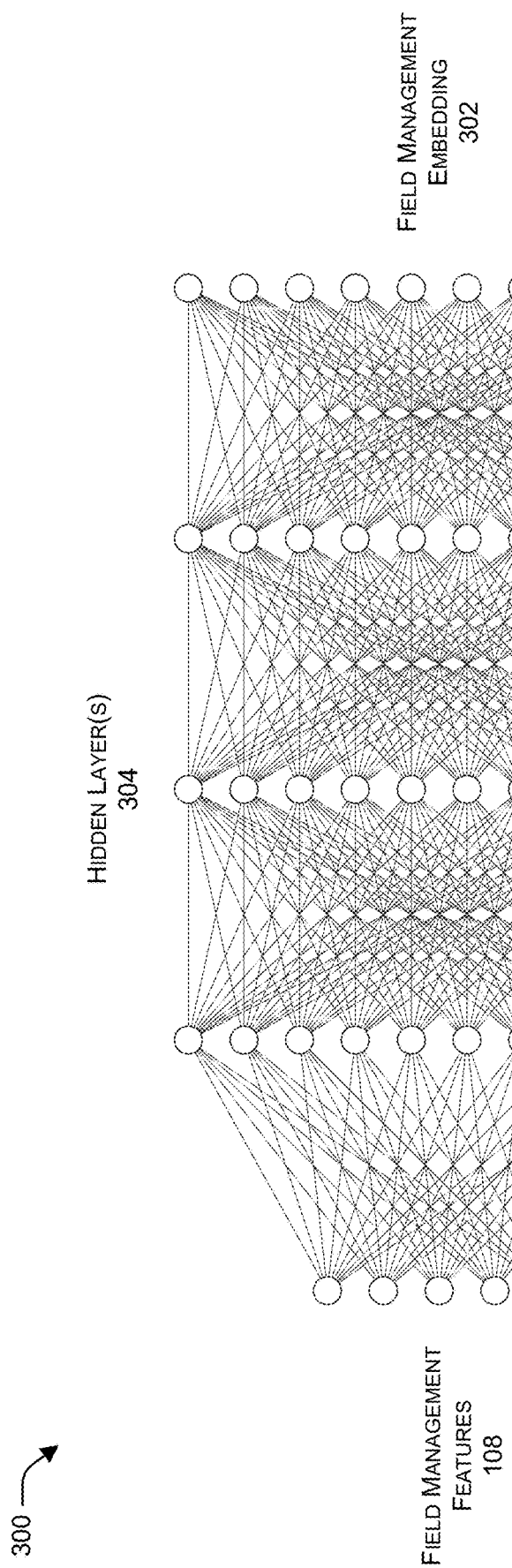
FIG. 3 is a schematic diagram of one implementation of a neural network for converting field management features to a field management embedding.

FIG. 3 is a schematic diagram of one implementation of a neural network 300 for converting field management features 108 to a field management embedding 302. In the illustrated implementation, field management embedding 302 is created by a fully connected neural network 300. However, other types of neural networks may alternatively be used.

In this example implementation, five different field management features 108 are captured as inputs. However, any number of features may be used as inputs such as 1, 2, 3, 4, 5, 6, 7, 8, 9, 11, 12, 13, 14, 15, 16, 17, 18, 19, 20, 21, 22, 23, 24, 25, or more. The field management features 108 may include any or all of use of irrigation, irrigation amount, planting density, total amount of nitrogen (N) fertilizer, total amount of phosphorus (P) fertilizer, and total amount of potassium (K fertilizer. Depending on the availability of data, values for any of the features may be coarse grained. For example, instead of representing irrigation as a time series with daily amounts, the irrigation data may be simplified to a single value for aggregate irrigation provided over the growing season or even a binary indication of yes or no for irrigation. Fertilizer may be provided as NPK percentages or simplified to a binary indication of yes or no for fertilizer. The planting density may be provided as the number of seeds or seedlings sown per unit of area. Any of the previous features may be omitted and other features not explicitly identified here may be included. Values of the field management features 108 are the input layer of the neural network 300.

The neural network 300 includes at least one hidden layer 304 and may have multiple hidden layers. In this example, the neural network 300 includes three hidden layers 304. However, it may have 1, 2, 3, 4, 5, or a greater number of hidden layers 304. In this example, each hidden layer 304 has 10 nodes; however, the hidden layers 304 may have a greater or fewer number of nodes and each of the hidden layers 304 may have a different number of nodes than the others. The neural network 300 may be trained with any suitable activation function such as the rectified linear activation function. In this example, each node of the hidden layers 304 is a rectified linear activation unit (ReLU). The field management embedding 302 generated by the neural network 300 in this example has a size of 10. However, the field management embedding 302 may have a different size such as 5, 6, 7, 8, 9, 10, 11, 12, 13, 14, 15, 16, 17, 18, 19, 20, or larger. Hyperparameters such as the number of hidden layers 304, and the number of nodes in each layer including in the final embedding may be determined by any suitable technique known to those of ordinary skill in the art.

Figure 4:
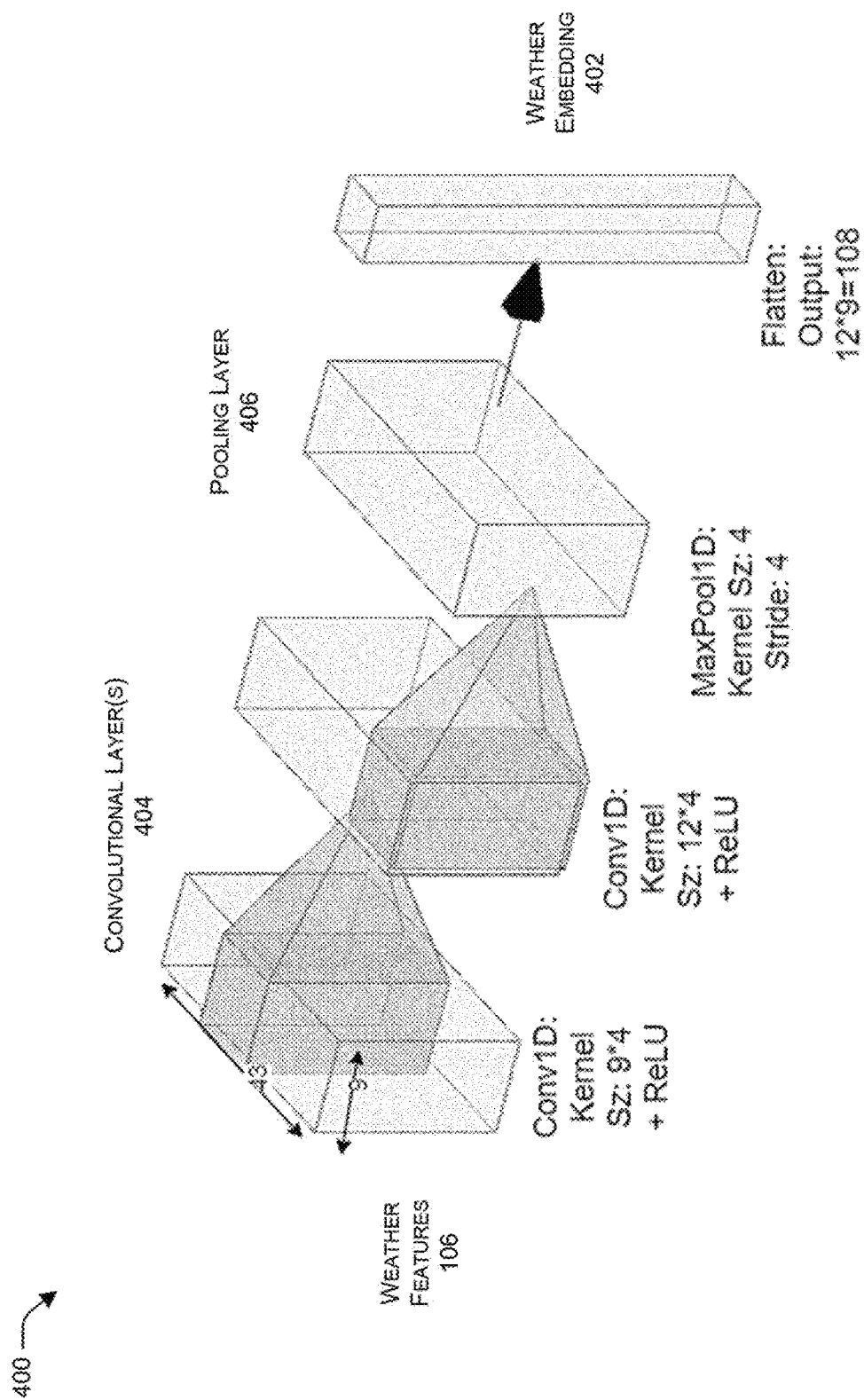
FIG. 4 is a schematic diagram of one implementation of a neural network for converting weather features to a weather embedding.

FIG. 4 is a schematic diagram of one implementation of a neural network 400 for converting weather features 106 to a weather embedding 402. The weather features 106 may be provided as a time-series of daily values of measurable attributes. The time-series may use any increment of time for each step in the time-series. In one implementation, the time-series may include a single numerical value for each weather feature 106 per day during the growing season. Individual values for multiple days may be aggregated (e.g., by averaging) to reduce the number of time points. The weather features 106 may include any number of time steps such as 10, 20, 30, 50, 60, 70, or more. In this example, the weather features 106 include data for nine different features over 43 time steps.

There may be any number of weather features 106. For example, there may be 1, 2, 3, 4, 6, 7, 8, 9, 10, 11, 12, 13, 14, 15, or more separate features. The weather features 106 may include any or all of solar radiation, vapor pressure, dewpoint, precipitation, maximum temperature, minimum temperature, wind speed, relative humidity, dewpoint, day length, and growing degree days (GDD). GDDs, also called growing degree units (GDUs), are a heuristic tool in phenology. GDDs are a measure of heat accumulation to predict plant development rates such as the date that a crop will reach maturity. For example, the GDD for corn is about 1100-1300. Growing degrees (GDs) is defined as the number of temperature degrees above a certain threshold base temperature, which varies among crop species. The base temperature is the temperature below which plant growth is zero. GDs are calculated each day as maximum temperature plus the minimum temperature divided by 2, minus the base temperature. GDDs are accumulated by adding each day's GDs contribution as the season progresses. The inventors have identified that inclusion of GDD in the weather data markedly improves yield prediction.

In the illustrated implementation, the weather embedding 402 is created by a convolutional neural network (CNN) 400. However, other types of neural networks may alternatively be used. The neural network 400 may have multiple convolutional layers 404. In this example there are two. However, there may be only a single convolutional layer 404 or there may be a greater number of convolutional layers 404 such as 3, 4, 5, or more. Subsequent layers of convolution increase the context. In some implementations, the convolutional layers 404 are one-dimensional convolutional layers. convolutional layers 404 may be trained with any suitable activation function such as the rectified linear activation function. The convolutional layer(s) 404 may be followed by a pooling layer 406. Any type of suitable pooling operation may be used such as average pooling or maximum pooling. In one implementation, the pooling layer 406 is a max pool layer.

Each weather feature is a separate channel in the input to the first convolutional layer. The first convolutional layer may use a kernel size of three to consider three time steps such as a given day and the days immediately before and afterward. Other kernel sizes are also possible such as two or greater than three. The second and any subsequent convolutional layers may use the same kernel size (e.g., three) or a different kernel size. In an implementation, the kernel size for the pooling layer 406 is four and the stride is four. All of the hyperparameters for the neural network 400 may be varied and not limited to the specific values provided in this example. Persons of ordinary skill in the art are readily able to evaluate and select suitable hyperparameters. The output from the pooling layer 406 is flattened to obtain a vector, or one-dimensional array, that is the weather embedding 402.

Persons of ordinary skill in the art will readily understand how to use CNNs to create an embedding from time-series data. One suitable technique that may be used is described in Zhicheng Cui, Wenlin Chen, and Yixin Chen. *Multiscale convolutional neural networks for time series classification.* CoRR, abs/1603.06995, 2016.

Figure 5:
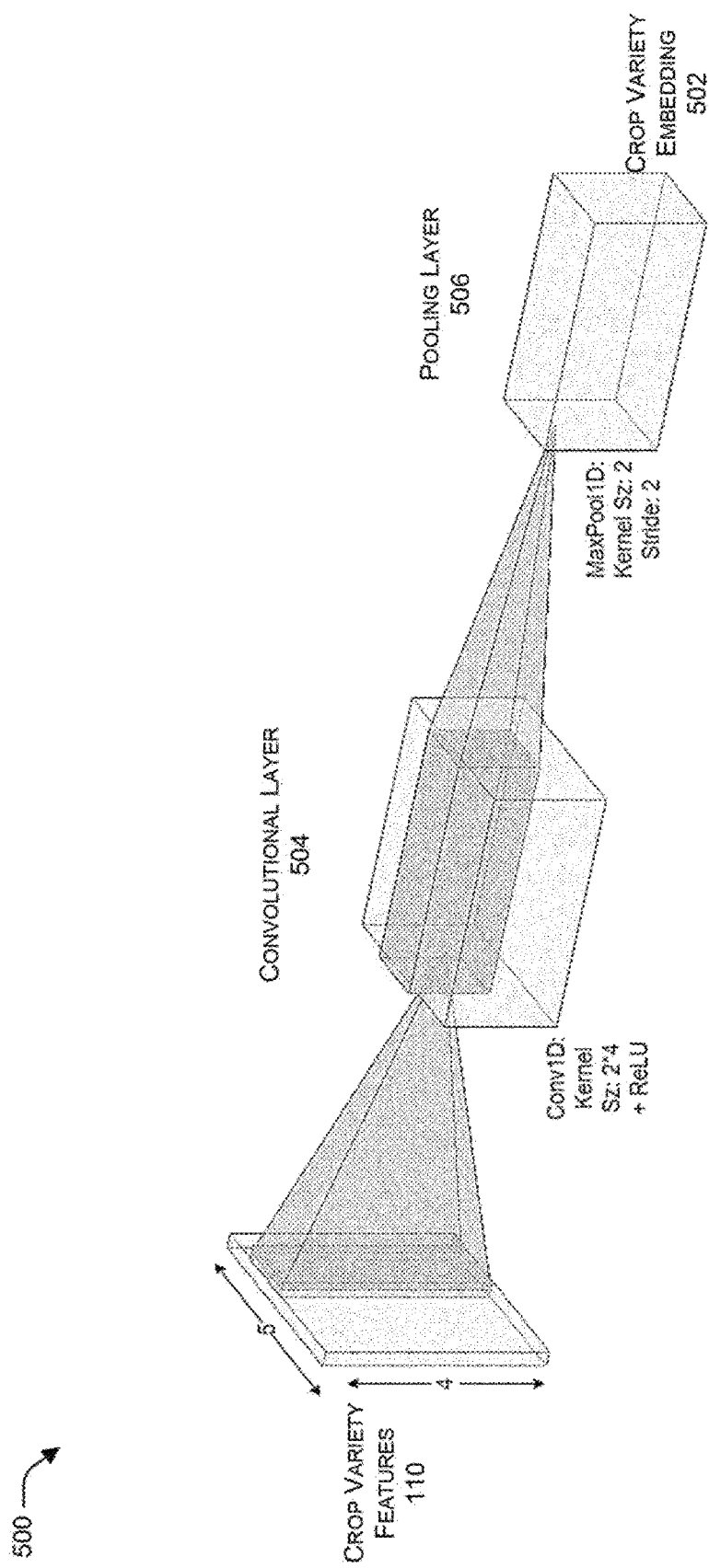
FIG. 5 is a schematic diagram of one implementation of a neural network for converting crop variety features to a crop variety embedding.

FIG. 5 is a schematic diagram of one implementation of a neural network 500 for converting crop variety features 110 to a crop variety embedding 502. The neural network 500 is illustrated in this example as a CNN but may be implemented as any type of neural network.

The inventors have recognized that genetic variations (e.g., SNPs) in the genome may be analogized to words and the genome may be processed using machine learning techniques from NLP. NLP is able to distinguish that a word has different meanings in different contexts. Similarly, the same gene can affect the phenotype differently depending on context. Also, there are many words that are synonyms. This is analogous to multiple genes that have similar influence on phenotype.

In order to use NLP techniques, the genome is processed as a sentence with genes analogous to words. In natural language, the meaning of a word depends on the other words in the sentence, usually termed as context. Similarly, the effect a gene has on the phenotype depends on context—the other genes in the genome. In this analogy, the phenotype of the plant is the meaning of the genome "sentence." The effect the genome has the phenotype depends on the genes in the genome and how they interact with each other—the intra-genome effects.

Genome information is often available as gene sequences which are strings of the letters A, G, C, and T. There are a large number of possible ways that a genome could be broken into subunits analogous to words for use in an NLP model. One possible technique treats the entire sequence of each gene as a word. Thus, the full string of nucleotides for each discrete gene would be processed as a "word." Another possible technique divides the entire genome into shorter fragments (e.g., 20-100 nucleotides long) without regard to the locations of genes and uses the short fragments as "words." However, dividing a genome into "words" in these ways did not yield accurate predictions. Multiple other techniques other than those described above are also possible.

The inventors have discovered that using SNPs (single nucleotide changes with respect to a reference genome for the crop species) to represent "words" in the genome provides good predictive power. The SNP genomic data can be represented with one-hot encoding of length four to denote the four nucleotide bases A, C, G, and T. Heterozygous SNPs, i.e., SNPs that take two different values (for the two alleles for the case of diploid organisms), are denoted as having half of two bases. For instance, the degenerated nucleotide K is represented as 0.5 G and 0.5 T.

Context is provided by appending nearby genome sequences from the reference genome. The nearby genome sequences may be the adjacent nucleotides that are 1, 2, 3, 4, 5, 6, 7, 8, or more positions before and/or after the location of the SNP in the genome. Thus, a given SNP is represented as a matrix with a height of four and a width that depends on the number of neighboring nucleotides appended from the reference genome. For example, the representation of an SNP from a hybrid variety of corn with G on one strand and T on the other at position 23 on chromosome 7 is shown in the following table.

| Sequence | Genome Nucleotides | | SNP | Genome Nucleotides | |
| --- | --- | --- | --- | --- | --- |
|  | C | G | K | C | A |
| A | 0 | 0 | 0 | 0 | 1 |
| C | 1 | 0 | 0 | 1 | 0 |
| G | 0 | 1 | 0.5 | 0 | 0 |
| T | 0 | 0 | 0.5 | 0 | 0 |

This example shows two nucleotides from either side of the SNP (positions 21, 22, 24, and 25) to provide context. Thus, this SNP is represented as a 4×5 matrix.

For many crop species there are tens of thousands of identified SNPs. However, modeling all of the SNPs may be computationally intractable or create an overly large model. Although, the deep learning system may use all known SNPs, in some implementations the model uses only a subset of the known SNPs. The subset of SNPs used in the model may be selected based on the predictive power those SNPs have for the crop characteristic of interest. Thus, if the crop characteristic that is being modeled is yield, the model may consider only SNPs identified as affecting yield.

One technique that may be used to select SNPs for inclusion in the model is recursive feature elimination. Recursive feature elimination is a feature selection method that fits a model and removes the weakest feature (or features) until the specified number of features is reached. Recursive feature elimination may be used to pick a subset of SNPs (e.g., 1000 or some other number) with the highest predictive power for the crop characteristic of interest. This modeling uses only the SNPs to predict the crop characteristic and does not consider other contexts.

Another technique that may be used to select a subset of the SNPs is mutual information (i.e., principal component analysis). The mutual information of two SNPs is a measure of the mutual dependence between the two SNPs. More specifically, it quantifies the "amount of information" obtained about one SNP by observing the other SNP. This identifies combinations of SNPs that occur together and correlate with the crop characteristic of interest.

Multiple techniques for selecting a subset of relevant SNPs from all known SNPs may be combined in a multistep (e.g., a two-step) process. For example, if there are 20,000 SNPs known to be associated with a phenotype, that number may be reduced to a lower number such as 1000 by recursive feature elimination. Then, mutual information may be used to further reduce the number of SNPs to a smaller number such as, for example 100. However, any technique, including techniques other than recursive feature elimination and mutual information, may be used to select a subset of SNPs to use for training and predicting the effects of crop variety features 110.

Matrices representing the selected SNPs are provided as the crop variety features 110 to the neural network 500. The neural network 500 in this example shows a 5×4 matrix representing the one-hot encoding of a given SNP and two nucleotides on either side. This captures local interrelationships from the genome by including the nucleotides on either side of the SNP. The neural network 500 includes at least one convolutional layer 504 but may include more. The convolutional layer 504 may be a one-dimensional CNN. The CNN can use multiple kernels (e.g., 1-10, such as 5) of multiple different sizes (e.g., 2, 3, 4) which convolve over the SNP sequence to capture intragenomic interactions. The same set of kernels may be used for all SNPs.

The convolutional layer 504 is followed by a pooling layer 506. Any type of suitable pooling operation may be used such as average pooling or maximum pooling. In one implementation, the pooling layer 506 is a max pool layer. The pooling layer 506 may be implemented with a kernel size of two and a stride of two although other values may also be used. The output from the pooling layer 506 is flattened to obtain a vector, or one-dimensional array, that is the crop variety embedding 502 for the collection of SNPs evaluated.

Positional information is added to each SNP embedding to encode chromosome number and position number within the respective chromosome. In some cases, the positional embeddings are learned. The term "learned" means that an operation or a value has been adjusted during the training of the neural network.

In other implementations, the positional embeddings are fixed and are different for each position. For example, the embeddings can be made up of sine and cosine functions of different frequencies and can satisfy:

$$PE_{(pos,2i)} = \sin(pos/1000^{2i/d_{model}})$$

$$PE_{(pos,2i+1)} = \cos(pos/1000^{2i/d_{model}})$$

where pos is the position, i is the dimension within the positional embedding, and $d_{model}$ is the dimensionality of the positional embedding (and of the other vectors processed by the neural network). The use of sinusoidal positional embeddings may allow the model to extrapolate to longer genome lengths. A technique for providing sinusoidal positional embeddings is described in NLP applications such as those described in Ashish Vaswani, Noam Shazeer, Niki Parmar, Jakob Uszkoreit, Llion Jones, Aidan N. Gomez, Lukasz Kaiser, and Illia Polosukhin. *Attention is all you need.* CoRR, abs/1706.03762, 2017. Thus, cytogenetic location can be added to each SNP embedding by labeling, by using sin-cos functions, or by another technique.

Positional encoding allows for modeling genome-to-genome interactions between multiple SNPs are modeled using the NLP technique of self-attention. Self-attention, sometimes called intra-attention, is an attention mechanism relating different positions of a single sequence in order to compute a representation of the sequence. The use of attention mechanisms allows a neural network to effectively learn dependencies between distant positions during training, improving the accuracy of the neural network. Thus, self-attention may consider the context of SNPs in view of all the SNPs considered by the model.

Figure 6A:
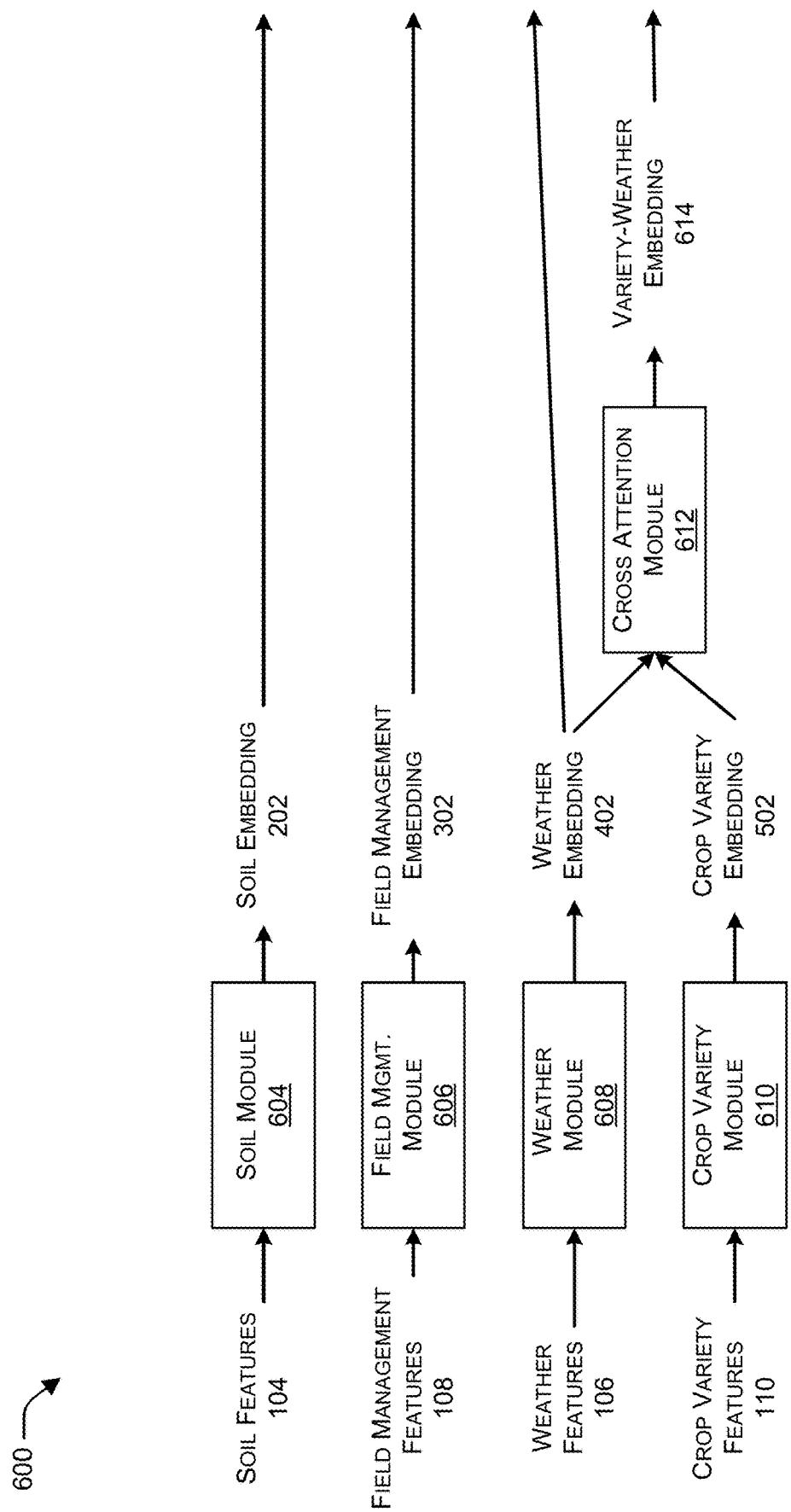
FIGS. 6A and 6B are schematic diagrams that illustrate the overall architecture of a system that generates embeddings and provides embeddings to the DNN for prediction of the crop characteristic.
Figure 6B:
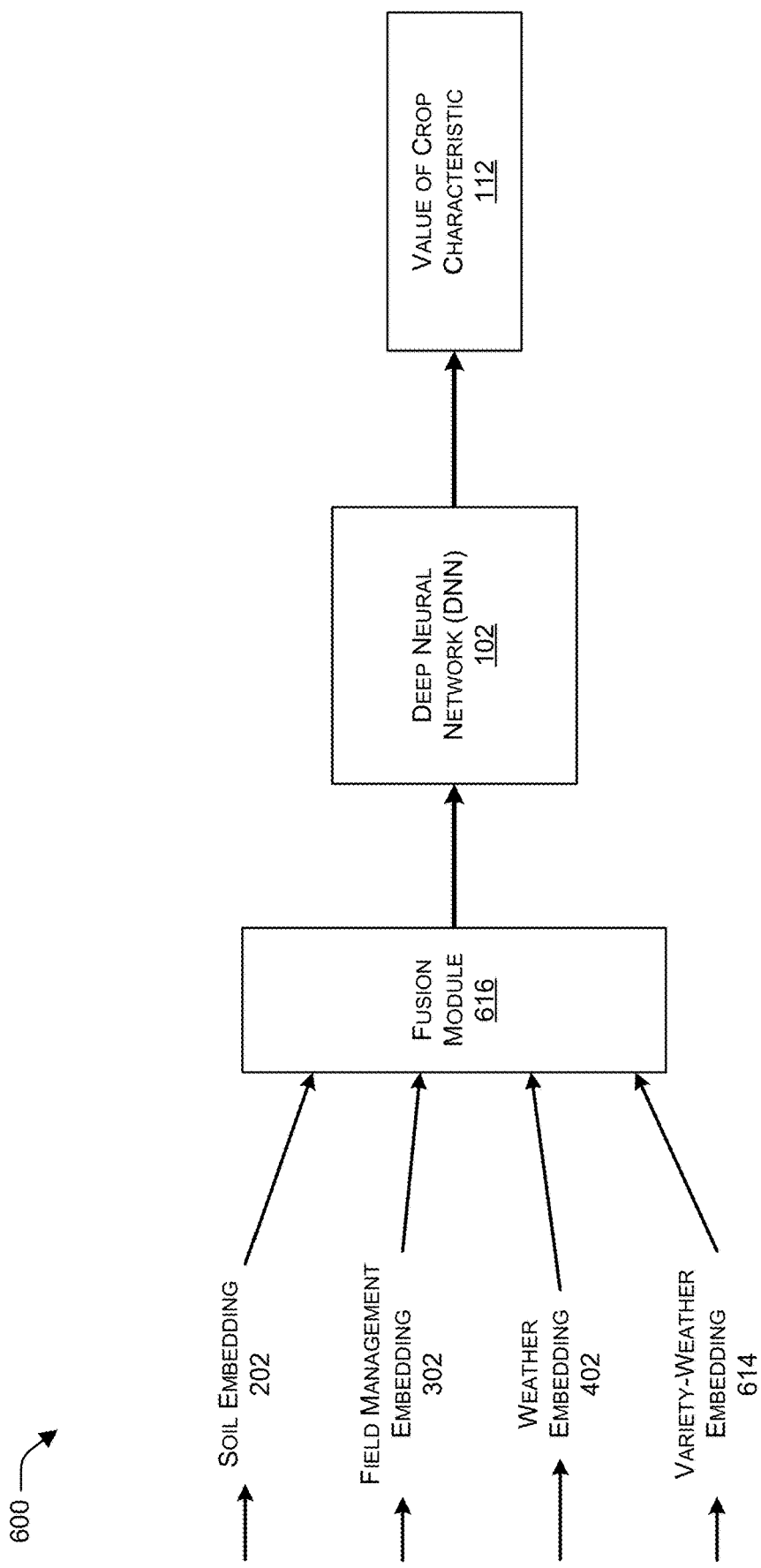

FIGS. 6A and 6B show a schematic diagram 600 that illustrates the overall architecture of a system that generates embeddings and provides those embeddings to the DNN 102 for the prediction of the value of a crop characteristic 112. FIGS. 6A and 6B provide greater details about the model introduced in FIG. 1. The soil features 104, field management features 108, weather features 106, and crop variety features 110 are passed through a respective module which uses a neural network to create respective embeddings. The embeddings are vectors that provide a numerical representation of the features.

The soil features 104 are provided to a soil module 604 that produces a soil embedding 202 as described in FIG. 2. The field management features 108 are provided to a field management module 606 that produces a field management embedding 302 as described in FIG. 3. The weather features 106 are provided to a weather module 608 that produces a weather embedding 402 as described in FIG. 4. The crop variety features 110 are provided to crop variety module 610 to produce the crop variety embedding 502 as described in FIG. 5.

In one implementation, all of these embeddings are used individually to train the DNN 102. Thus, the cross attention module 612 (described below) may be omitted. However, in some implementations cross attention may be used to model the effects that features from two different domains have on each other. In the example implementation illustrated in FIGS. 6A and 6B, cross attention is provided between the weather embedding 402 and the crop variety embedding 502 by the cross attention module 612. However, cross attention may be used for any of the embeddings and is not limited to only the weather embedding 402 and the crop variety embedding 502. For example, the cross attention module 612 may alternatively provide cross attention between the crop variety embedding 502 and any of the other embeddings such as the soil embedding 202. There may also be multiple cross attention modules 612 such as, for example, a second cross attention module that provides cross attention between two other embeddings such as, for example, the weather embedding 402 and the filed management embedding 302.

Cross attention is an attention mechanism from NLP that mixes two different embedding sequences. Cross attention combines asymmetrically two separate embedding sequences of the same dimension. Given one cell in one embedding, this technique asks which cells in other embeddings activate. Cross attention techniques for attending to different embeddings are known to those of ordinary skill in the art. One example of a suitable cross attention technique is described in Hao Tan and Mohit Bansal. *Lxmert: Learning cross-modality encoder representations from transformers*, 2019.

In the illustrated implementation, a cross attention module 612 captures interactions between weather and a crop genome on the ultimate phenotype of the crop to generate a variety-weather embedding 614. The effect of a gene, or SNP, on crop phenotype may vary depending on the environment (e.g., weather) experienced by the crop. For example, some genes can have a large effect on crop yield when temperatures are cool while different genes are more impactful if the weather is hot. The cross attention module 612 adds weather as context to the SNPs representing the genome. The cross attention module 612 attends over the weather embedding 402 across timesteps and adds to the crop variety embedding 502. The weather embedding 402 represents timesteps and may be weighted by how strongly each timestep interacts with the crop variety embedding 502.

For each SNP, the crop variety embedding 502 as output by the crop variety module 610 is treated as the query vector x, and the weather embedding sequence, $\{y_1, y_2, \ldots, y_N\}$ is used to calculate the matching score $\alpha_i$ between the query vector and each context vector. This can be represented as:

$$\{\alpha_i\}=\text{SoftMax}(\{\text{score}(x,y_1), \ldots, \text{score}(x,y_N)\})$$

The matching score $\alpha_i$ between the SNP embedding and each context vector signifies how important each timestep of the weather features 106 is with respect to the SNP. Single-head attention can be used to get the weighted sum of context vectors as the output, i.e., $\text{Attention}(x, \{y_i\})=\Sigma_j \alpha_j y_j$. A single dense layer is added to get the final embedding 614 for each of the SNPs that have the same length as the crop variety embedding 502. The output is added to the crop variety embedding 502.

The cross attention module 612 may also include a pooling layer. In one implementation, the pooling layer is implemented as a max pooling layer. The pooling layer combines the embeddings of all the individual SNPs into a single vector which is the variety-weather embedding 614.

The soil embedding 202, the field management embedding 302, the weather embedding 402, and the variety-weather embedding 614 are combined by the fusion module 616 to generate the DNN 102. Note that the weather embedding 402 is provided directly to the fusion module 616 and is included in the variety-weather embedding 502 through cross attention. Also note that in this example implementation, the crop variety embedding 502 is not provided to the fusion module 616 except through the variety-weather embedding 502. The DNN 102 is then able to predict a value of a crop characteristic 112.

Figure 7:
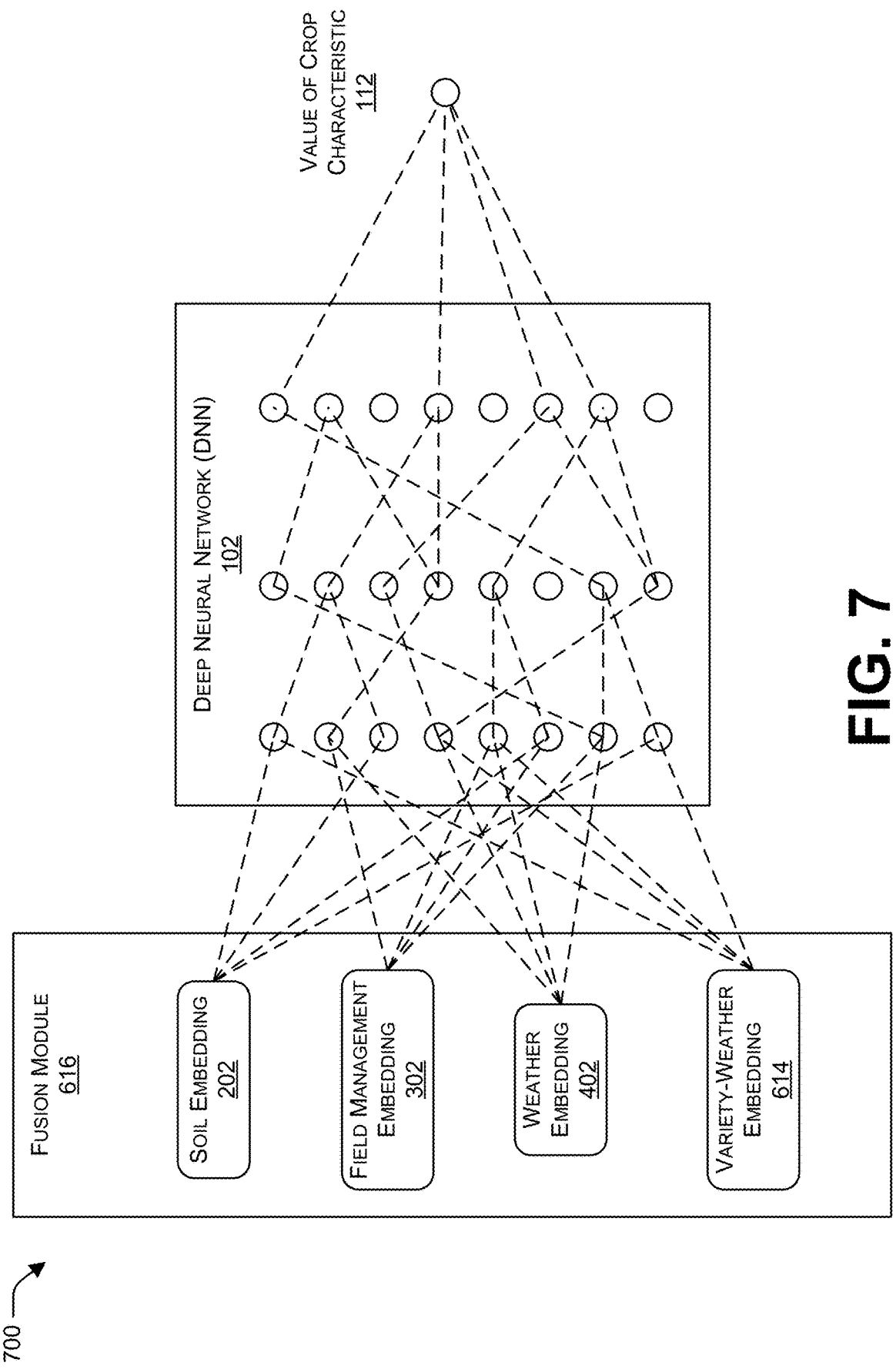
FIG. 7 is a schematic diagram providing additional details of a fusion module and the DNN introduced in FIG. 1.

FIG. 7 is a schematic diagram 700 providing additional details of the fusion module and the DNN introduced 102. Each of the embeddings are concatenated and passed through a DNN comprising a series of fully connected layers. Deep learning refers to a neural network with a credit assignment path (CAP) greater than two. The CAP is the chain of transformations from input to output. CAPs describe potentially causal connections between input and output. Very deep learning refers to a neural network with a CAP greater than 10. The DNN 102 is a neural network that implements deep learning and, in some implementations, it implements very deep learning.

In one implementation, the DNN 102 has at least two fully connected layers such as, for example, three fully connected layers. However, there may be a greater or lesser number of layers. Hyperparameters for the DNN 102 such as the number of hidden layers 204, and the number of nodes in each layer may be determined by any suitable technique known to those of ordinary skill in the art. The DNN 102 may be trained with dropouts. The DNN 102 may be trained with any suitable activation function such as the rectified linear activation function. The output of the DNN 102 is a single value which is a value of a crop characteristic 112 or predicted phenotype. The phenotype may be crop yield that can be represented in kilograms per hectare. Other phenotypes may also be predicted such as crop height in meters. The phenotype of disease resistance may be represented as a binary value (resistant or not) or as a value on a scale (e.g., 0 to 5).

Illustrative Methods

Figure 8:
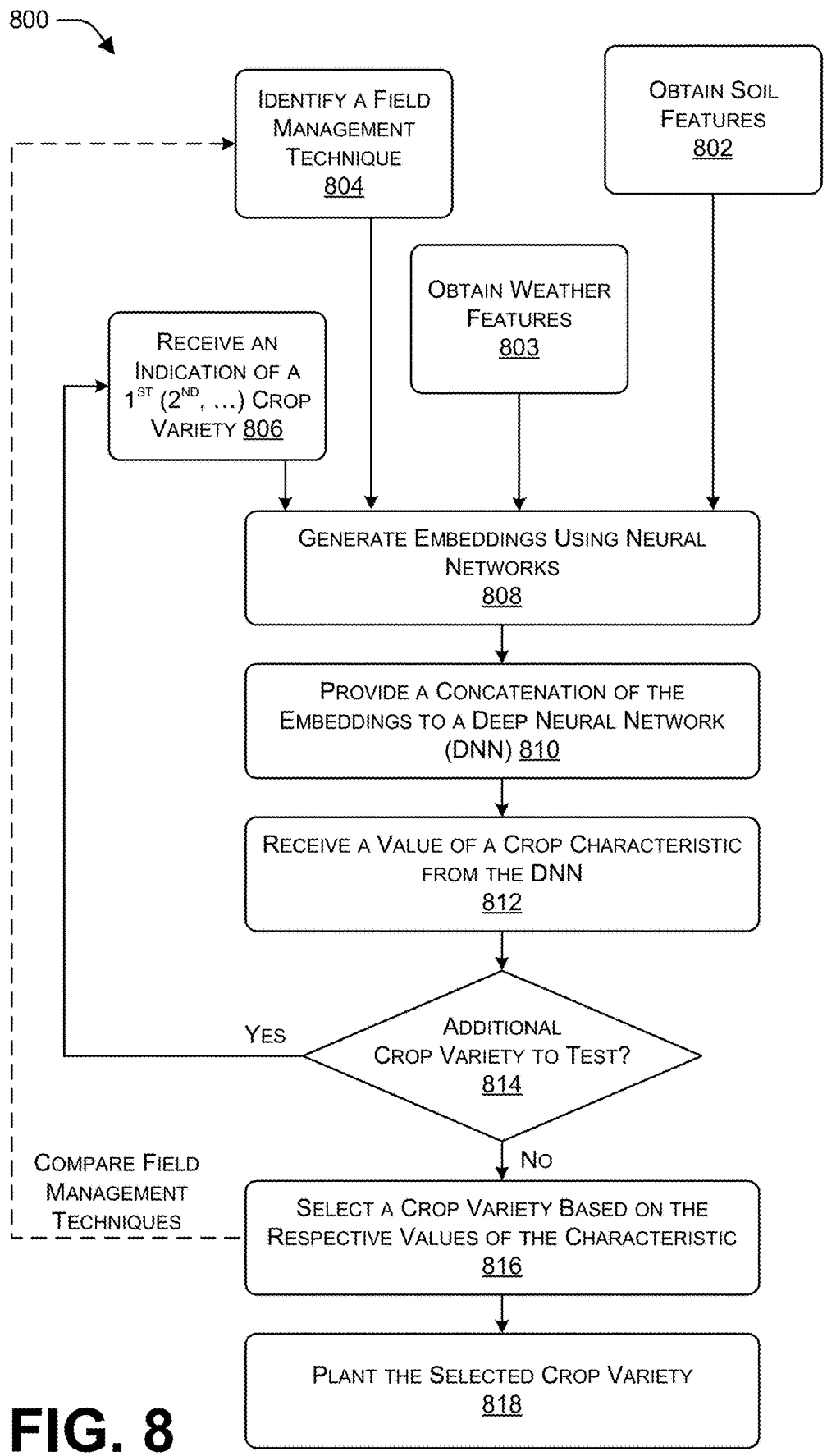
FIG. 8 is a flow diagram of an illustrative method for using a DNN to select a crop variety for planting.
Figure 9:
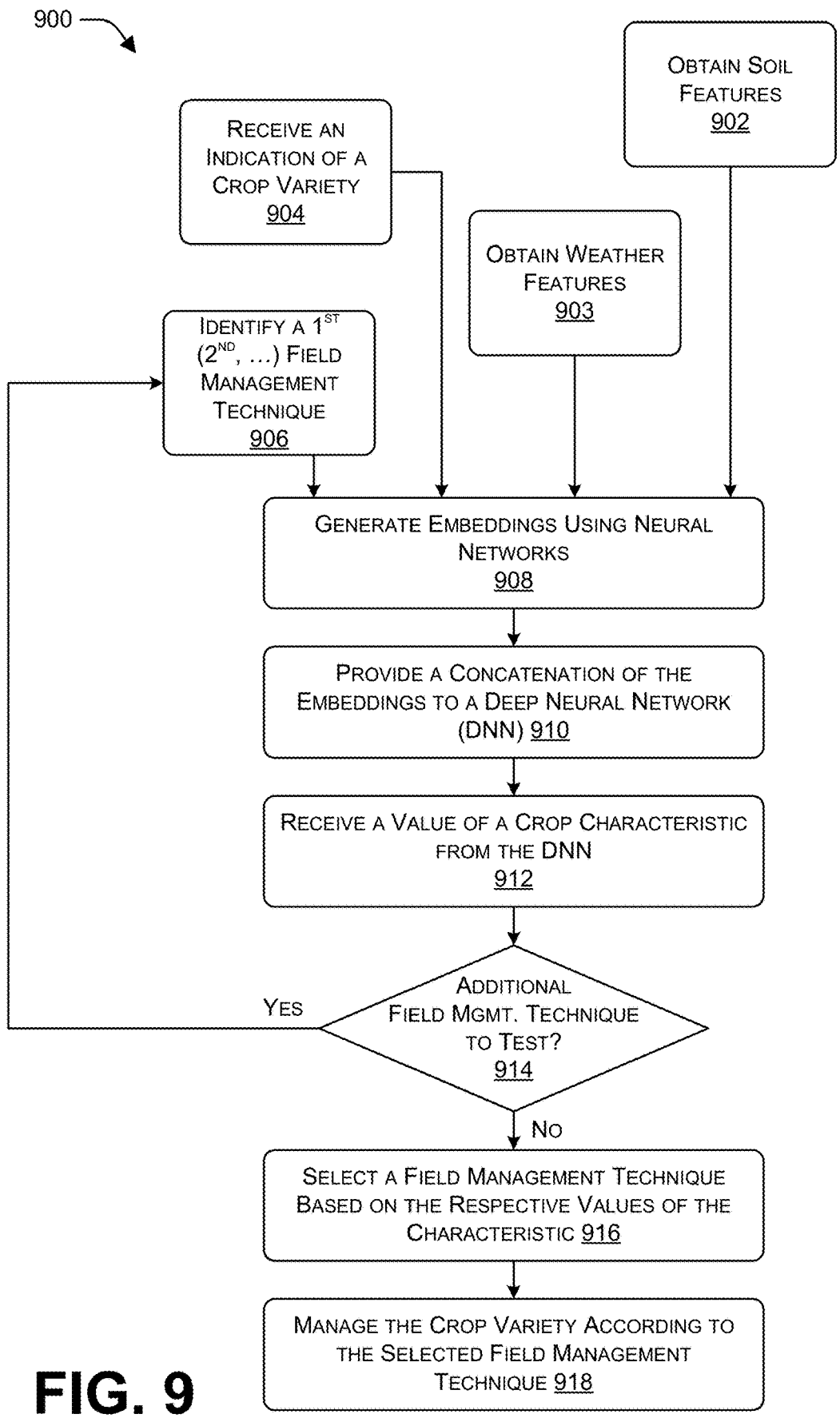
FIG. 9 is a flow diagram of an illustrative method for using a DNN to select a field management technique to use with a planted crop.

For ease of understanding, the processes discussed in FIGS. 8 and 9 are delineated as separate operations represented as independent blocks. However, these separately delineated operations should not be construed as necessarily order dependent in their performance. The order in which a process is described is not intended to be construed as a limitation, and any number of the described process blocks may be combined in any order to implement the process or an alternate process. Moreover, it is also possible that one or more of the provided operations is modified or omitted.

FIG. 8 is a flow diagram of an illustrative method 800 for using a DNN to select a crop variety for planting. Method 800 may be implemented with the neural networks shown in FIGS. 1-7. Given a particular context (e.g., environment and field management), this DNN can evaluate multiple crop varieties to determine which will produce a desirable phenotype (e.g., highest yield).

At operation 802, soil features are obtained for a field. The soil features may include, but are not limited to, percentage of clay, percentage of sand, percentage of silt, percentage of organic matter, calcium content, magnesium content, phosphorus content, nitrate content, potassium content, sodium content, sulfate content, pH, soil conductivity, percentage of calcium saturation, percentage of hydrogen saturation, percentage of potassium saturation, percentage of magnesium saturation, and percentage of sodium saturation.

At operation 803, weather features are obtained for the field. The soil features and the weather features are examples of environmental features. The soil features and weather features may be obtained from any combination of direct measurements in the field and databases of past data. The weather features may include, but are not limited to, solar radiation, vapor pressure, dewpoint, precipitation, maximum temperature, minimum temperature, wind speed, relative humidity, dewpoint, day length, and growing degree days (GDD). The weather features may be a time series that spans all or part of the growing season for the crop.

At operation 804, a field management technique is identified. The field management technique represents a prospective plan for how the crop will be managed during the growing season. Features included in describing the field management technique may include, but are not limited to, use of irrigation, irrigation amount, planting density, total amount of nitrogen (N) fertilizer, total amount of phosphorus (P) fertilizer, and total amount of potassium (K fertilizer. This may be based on past field management practices for the crop for the field or similar fields.

At operation 806, an indication of a crop variety is received. The crop variety is a specific variety of a crop and features of the crop variety are represented by the genome of that crop variety. In one implementation, the features of the crop variety are a series of SNPs found in the genome of the crop variety. Each of the SNPs may be encoded with positional embedding based on locations in the genome relative to other SNPs. Method 800 may be repeated multiple times with variations to the crop variety that is tested. Thus, the method 800 may be used to compare a first crop variety, a second crop variety, etc.

At operation 808, embeddings are generated using neural networks from the soil features, the weather features, the field management features, and the features of the crop variety. A soil embedding may be generated from the soil features as shown in FIG. 2. A field management embedding may be generated from the field management features as shown in FIG. 3. A weather embedding may be generated from the weather features as shown in FIG. 4. A crop variety embedding may be generated from the crop variety features as shown in FIG. 5.

In one implementation, a soil embedding is created from the soil features by a first neural network, a weather embedding is created from the weather features by a second neural network, a field management embedding is created from the field management features by a third neural network, and a variety embedding is created from the features of the crop variety by a fourth neural network. For example, first neural network may be a fully-connected neural network, the second neural network may be a CNN, the third neural network may be a fully-connected neural network, and the fourth neural network may be a CNN.

Any two or more of the embeddings may be combined with cross attention. For example, a variety-weather embedding may be created by combining the crop variety embedding and the weather embedding with cross attention as shown in FIG. 6A. Other combinations of embeddings may also be combined using multi-modal cross attention. Cross attention is an attention mechanism from NLP that mixes two different embedding sequences. Cross attention combines asymmetrically two separate embedding sequences of the same dimension. Given one cell in one embedding, this technique asks which cells in other embeddings activate.

At operation 810, a concatenation of the embeddings generated at operation 808 is provided to a DNN trained to predict a value for a specific feature of the crop. In an implementation, the DNN is the DNN 102 shown in FIG. 7. The concatenation of the embeddings is the input to the DNN and the output is a predicted value for the crop characteristic. In an implementation without cross attention, concatenating the embeddings comprises concatenating the soil embedding, the field management embedding, the weather embedding, and the crop variety embedding. In one example implementation with cross attention, concatenating the embeddings comprises concatenating the soil embedding, the field management embedding, the weather embedding, and the variety-weather embedding generated from cross attention between the weather embedding and the crop variety embedding.

At operation 812, the predicted value for the characteristic of the crop variety is received from the DNN. In some implementations, the predicted value is a single number that represents a characteristic such as yield, protein content, moisture content, fiber content, or some other quantifiable phenotype of the crop. In other implementations, the predicted value may be a binary value indicating the presence or absence of a characteristic such as disease resistance or pest resistance. The predicted value may be stored in a computer memory for later recall and comparison to other predicted values.

At operation 814, if there is an additional crop variety to test, the method 800 proceeds along the "yes" path and returns operation 806. Each crop variety is represented by different genetic information which in turn leads to a different crop variety embedding. In some implementations, all of the other inputs (e.g., soil features, weather features, and features representing field management techniques) remain constant. Thus, any change in the predicted value output by the DNN is a result of the change in crop variety.

To reduce computational work and increase speed, embeddings that have already been generated and for which the inputs are not changing may be reused without regenerating those embeddings. For example, if the soil features do not change during a subsequent iteration of the method 800, the same soil embedding generated during the first iteration of the method 800 can be reused in the concatenation at operation 810. Thus, if the only inputs that change are the crop variety, the previously-generated soil embedding, weather embedding, and field management embedding may be concatenated with the new crop variety embedding and provided to the DNN.

By repeating this portion of method 800 with different crop varieties, a set of predicted values for the characteristic of the crop variety is generated. The crop varieties to test may include all known crop varieties such as all crop values for which there is a representation of the genome in a format that can be provided to a deep learning system. A smaller set of crop varieties may also be tested such as all the crop varieties that are available to a particular farmer for planting in the field. These predicted values may be a set of different values for grain yield, plant height, fiber content, moisture content, or any other phenotype of the crop. Once there are no more crop varieties to test, the method 800 proceeds from operation 814 along the "no" path to operation 816.

At operation 816, a crop variety is selected based on the respective predicted values for the crop characteristic received for each crop variety at operation 812. This crop variety becomes the selected crop variety. If the method 800 is used to compare only two crop varieties, either the first crop variety or the second crop variety is selected as the selected crop variety. Each of the values for the characteristics of the crop variety can be compared automatically by a computing system and/or manually by a human user. For example, a highest or lowest value may be selected depending on what is most desirable for the particular crop characteristic.

In some implementations, a plurality of different field management techniques may also be compared for the selected crop variety. Thus, after the crop variety is selected at operation 816, method 800 may return to operation 804 where a different field management technique is identified. The operations of concatenating embeddings and providing the concatenation of embeddings to the DNN are repeated for each of the plurality of field management techniques. During these iterations, the crop variety is unchanged and only the features for the field management technique change. Multiple values for the crop characteristic can then be generated from the DNN and a comparison of those values can be used to compare the respective field management techniques. One of the plurality field management techniques is selected based on the predicted values for the crop characteristic. Thus, for a given crop variety, the field management technique that provides the most desirable value for the crop characteristic is identified.

At operation 818, the selected crop variety is planted in the field. If the field management technique specifies how the crop is planted (e.g., planting density), then the selected crop variety may be planted as specified in by field management technique. After planting, the selected crop variety may be managed according to the selected one of the field management techniques. However, once the crop variety is selected at operation 816, the field management technique used by the DNN to determine the predicted value of the crop characteristic may be modified or an entirely different field management technique may be used.

FIG. 9 is a flow diagram of an illustrative method 900 for using a DNN to select a field management technique for use with a planted crop. Method 900 may be implemented with the neural networks shown in FIGS. 1-7. Once a crop has been planted the crop variety cannot be changed and the soil cannot be changed. Weather cannot be controlled but it may be predicted. The only input that can be changed is the field management technique. Method 900 can be used to compare the effects of different field management techniques on a crop phenotype.

At operation 902, soil features are obtained for a field. The soil features may include, but are not limited to, percentage of clay, percentage of sand, percentage of silt, percentage of organic matter, calcium content, magnesium content, phosphorus content, nitrate content, potassium content, sodium content, sulfate content, pH, soil conductivity, percentage of calcium saturation, percentage of hydrogen saturation, percentage of potassium saturation, percentage of magnesium saturation, and percentage of sodium saturation.

At operation 903, weather features are obtained for the field. The soil features and the weather features are examples of environmental features. The soil features and weather features may be obtained from any combination of direct measurements in the field and databases of past data. The weather features may include, but are not limited to, solar radiation, vapor pressure, dewpoint, precipitation, maximum temperature, minimum temperature, wind speed, relative humidity, dewpoint, day length, and growing degree days (GDD). The weather features may be a time series that spans all or part of the growing season for the crop.

At operation 904, an indication of a crop variety is received. This is the crop variety is currently planted in the field. The crop variety is a specific variety of a crop and features of the crop variety are represented by the genome of that crop variety. In one implementation, the features of the crop variety are a series of SNPs found in the genome of the crop variety. Each of the SNPs may be encoded with positional embedding based on locations in the genome relative to other SNPs.

At operation 906, a field management technique is identified. The field management technique represents a prospective plan for how the crop will be managed during the growing season. Features included in describing the field management technique may include, but are not limited to, use of irrigation, irrigation amount, planting density, total amount of nitrogen (N) fertilizer, total amount of phosphorus (P) fertilizer, and total amount of potassium (K fertilizer. This may be based on past field management practices for the crop for the field or similar fields. Method 900 may be repeated multiple times with variations to the field management technique that is tested. Thus, the method 900 may be used to compare a first field management technique, a second field management technique, etc.

At operation 908, embeddings are generated using neural networks from the soil features, the weather features, the field management features, and the features of the crop variety. A soil embedding may be generated from the soil features as shown in FIG. 2. A field management embedding may be generated from the field management features as shown in FIG. 3. A weather embedding may be generated from the weather features as shown in FIG. 4. A crop variety embedding may be generated from the crop variety features as shown in FIG. 5.

In one implementation, a soil embedding is created from the soil features by a first neural network, a weather embedding is created from the weather features by a second neural network, a field management embedding is created from the field management features by a third neural network, and a variety embedding is created from the features of the crop variety by a fourth neural network. For example, the first neural network may be a fully-connected neural network, the second neural network may be a CNN, the third neural network may be a fully-connected neural network, and the fourth neural network may be a CNN.

Any two or more of the embeddings may be combined with cross attention. For example, a variety-weather embedding may be created by combining the crop variety embedding and the weather embedding with cross attention as shown in FIG. 6A. Other combinations of embeddings may also be combined using multi-modal cross attention. Cross attention is an attention mechanism from NLP that mixes two different embedding sequences. Cross attention combines asymmetrically two separate embedding sequences of the same dimension. Given one cell in one embedding, this technique asks which cells in other embeddings activate.

At operation 910, a concatenation of the embeddings generated at operation 908 is provided to a DNN trained to predict a value for a specific feature of the crop. In an implementation, the DNN is the DNN 102 shown in FIG. 7. The concatenation of the embeddings is the input to the DNN and the output is a predicted value for the crop characteristic. In an implementation without cross attention, concatenating the embeddings comprises concatenating the soil embedding, the field management embedding, the weather embedding, and the crop variety embedding. In one example implementation with cross attention, concatenating the embeddings comprises concatenating the soil embedding, the field management embedding, the weather embedding, and the variety-weather embedding generated from cross attention between the weather embedding and the crop variety embedding.

At operation 912, the predicted value for the characteristic of the crop variety is received from the DNN. In some implementations, the predicted value is a single number that represents a characteristic such as yield, protein content, moisture content, fiber content, or some other quantifiable phenotype of the crop. In other implementations, the predicted value may be a binary value indicating the presence or absence of a characteristic such as disease resistance or pest resistance. The predicted value may be stored in a computer memory for later recall and comparison to other predicted values.

At operation 914, if there is an additional field management technique to test, the method 900 proceeds along the "yes" path and returns operation 906. Each different field management technique represents at least one change to a field management feature. For example, field management techniques with and without irrigation can be compared. Additionally, field management techniques with different amounts of irrigation may be compared. Similarly, field management techniques that use different types of fertilizer (i.e., with different NKP percentages) may be compared.

To reduce computational work and increase speed, embeddings that have already been generated and for which the inputs are not changing may be reused without regenerating those embeddings. For example, if the soil features do not change during a subsequent iteration of the method 900, the same soil embedding generated during the first iteration of the method 900 can be reused in the concatenation at operation 910. Thus, if the only inputs that change are the field management technique, the previously-generated soil embedding, weather embedding, and crop variety embedding may be concatenated with the new field management embedding and provided to the DNN.

By repeating this portion of method 900 with different field management techniques, a set of predicted values for the characteristic of the crop variety is generated. The field management techniques to test may include a large number of field management techniques that each vary from each other only slightly. They may also be limited to only those field management techniques that are known to be available for use in the field. For example, if irrigation is not available for a given field, testing of field management techniques that use irrigation can be omitted. These predicted values may be a set of different values for grain yield, plant height, fiber content, moisture content, or any other phenotype of the crop. Once there are no more field management techniques to test, the method 900 proceeds from operation 914 along the "no" path to operation 916.

At operation 916, a field management technique is selected based on the respective predicted values for the crop characteristic received for each field management technique at operation 812. This field management technique becomes the selected field management technique. If the method 900 is used to compare only two field management techniques, either the first field management technique or the second field management technique is selected as the selected field management technique. Each of the values for the characteristics of the crop variety can be compared automatically by a computing system and/or manually by a human user. For example, a highest or lowest value may be selected depending on what is most desirable for the particular crop characteristic.

At operation 918, the crop variety planted in the field is managed according to the selected field management technique. Method 900 may be repeated partway through the growing season to update the field management technique based on the weather. At the start of the growing season or shortly after planting, the weather features used for the DNN are predicted values based on a weather forecast and/or historical data. However, during the growing season the value of the crop characteristics can be predicted by the DNN using actual weather data for a first part of the growing season combined with predicted or forecast weather for a second part of the growing season. Updated weather features based on actual weather for the first part of the growing season can then be used in method 900. A plurality of different field management techniques can again be compared to see, in view of the actual weather thus far, if a different field management technique would be better to optimize the crop characteristic. For example, if there is more rainfall than predicted, the selected field management technique could be replaced with a different field management technique that uses less irrigation.

Illustrative Computing Architecture

Figure 10:
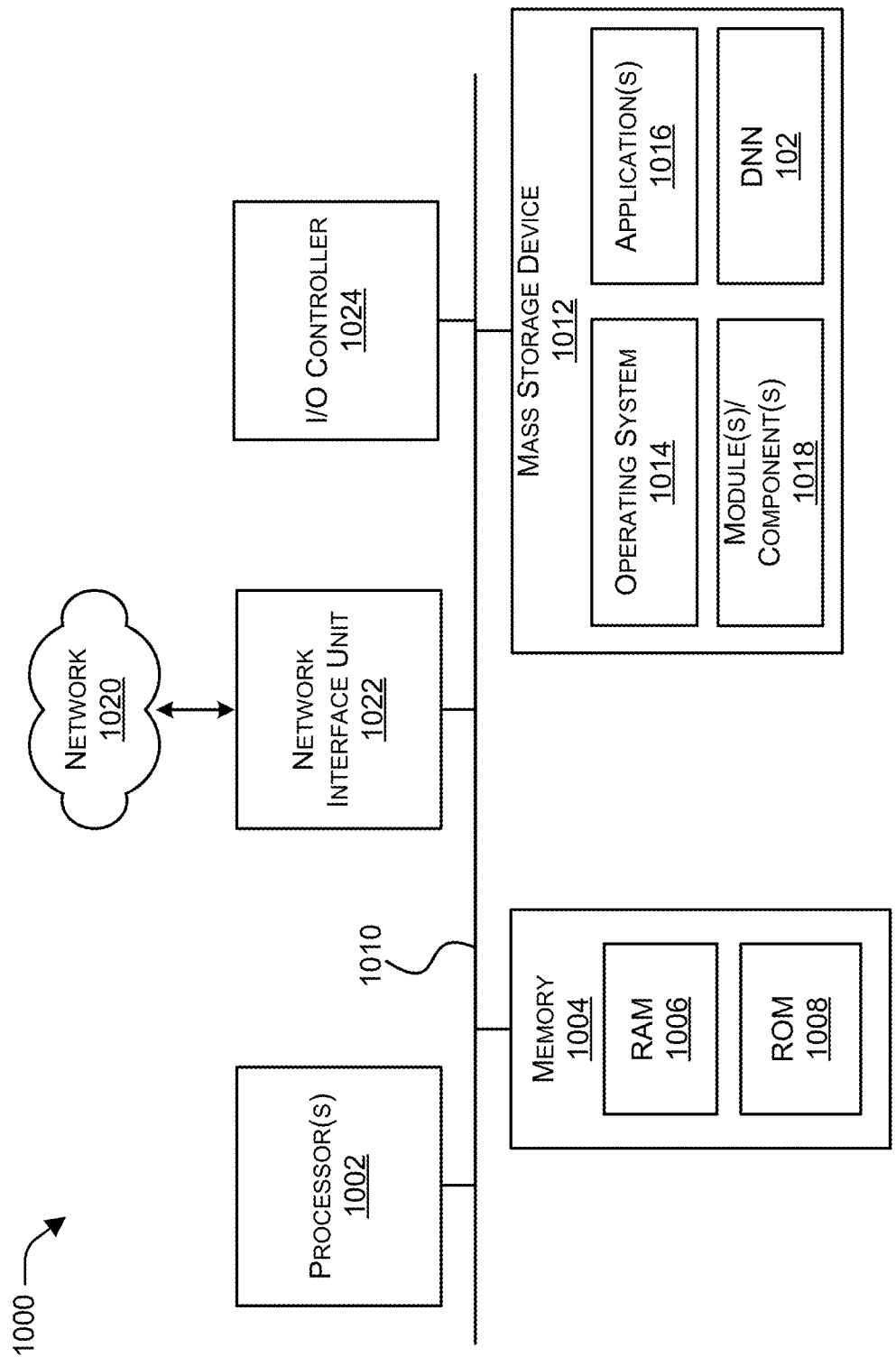
FIG. 10 is a computer architecture diagram illustrating an illustrative computer hardware and software architecture for a computing system capable of implementing aspects of the techniques and technologies presented herein.

FIG. 10 shows details of an example computer architecture 1000 for a device, such as a computer or a server configured as part of the cloud-based platform, capable of executing computer instructions (e.g., a module or a component described herein). The computer architecture 1000 illustrated in FIG. 10 includes processing unit(s) 1002, a system memory 1004, including a random-access memory 1006 ("RAM") and a read-only memory ("ROM") 1008, and a system bus 1010 that couples the memory 1004 to the processing unit(s) 1002. The processing units 1002 may also comprise or be part of a processing system. In various examples, the processing units 1002 of the processing system are distributed. Stated another way, one processing unit 1002 of the processing system may be located in a first location (e.g., a rack within a datacenter) while another processing unit 1002 of the processing system is located in a second location separate from the first location.

Processing unit(s), such as processing unit(s) 1002, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 1000, such as during startup, is stored in the ROM 1008. The computer architecture 1000 further includes a mass storage device 1012 for storing an operating system 1014, application(s) 1016, modules/components 1018, and other data described herein. The modules/components 1018 may include any or all of the soil module 604, the field management module 606, the weather module 618, the crop variety module 610, the cross attention module 612, and the fusion module 616. The mass storage device 1012 may also include the DNN 102.

The mass storage device 1012 is connected to processing unit(s) 1002 through a mass storage controller connected to the bus 1010. The mass storage device 1012 and its associated computer-readable media provide non-volatile storage for the computer architecture 1000. Although the description of computer-readable media contained herein refers to a mass storage device, it should be appreciated by those skilled in the art that computer-readable media can be any available computer-readable storage medium or communications medium that can be accessed by the computer architecture 1000.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static random-access memory (SRAM), dynamic random-access memory (DRAM), phase-change memory (PCM), ROM, erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network-attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer-readable storage media does not include communication media. Thus, computer-readable storage media excludes media consisting solely of a modulated data signal, a carrier wave, or a propagated signal, per se.

According to various configurations, the computer architecture 1000 may operate in a networked environment using logical connections to remote computers through the network 1020. The computer architecture 1000 may connect to the network 1020 through a network interface unit 1022 connected to the bus 1010. An I/O controller 1024 may also be connected to the bus 1010 to control communication in input and output devices.

It should be appreciated that the software components described herein may, when loaded into the processing unit(s) 1002 and executed, transform the processing unit(s) 1002 and the overall computer architecture 1000 from a general-purpose computing system into a special-purpose computing system customized to facilitate the functionality presented herein. The processing unit(s) 1002 may be constructed from any number of transistors or other discrete circuit elements, which may individually or collectively assume any number of states. More specifically, the processing unit(s) 1002 may operate as a finite-state machine, in response to executable instructions contained within the software modules disclosed herein. These computer-executable instructions may transform the processing unit(s) 1002 by specifying how the processing unit(s) 1002 transitions between states, thereby transforming the transistors or other discrete hardware elements constituting the processing unit(s) 1002.

Figure 11:
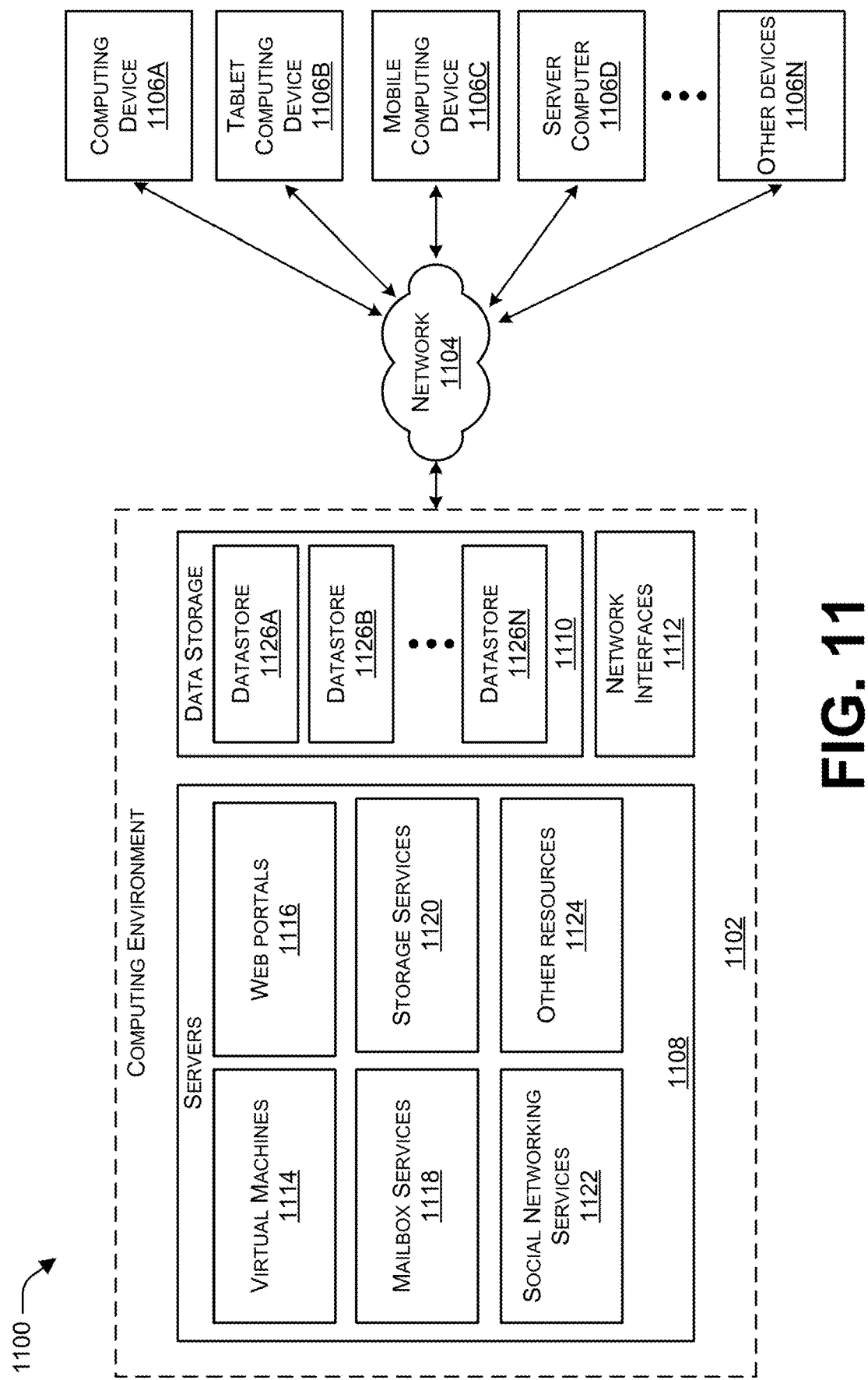
FIG. 11 is a diagram illustrating a distributed computing environment capable of implementing aspects of the techniques and technologies presented herein.

FIG. 11 depicts an illustrative distributed computing environment 1100 capable of executing the components described herein. Thus, the distributed computing environment 1100 illustrated in FIG. 11 can be utilized to execute any aspects of the components presented herein.

Accordingly, the distributed computing environment 1100 can include a computing environment 1102 operating on, in communication with, or as part of the network 1104. The network 1104 can include various access networks. One or more client devices 1106A-1106N (hereinafter referred to collectively and/or generically as "clients 1106" and also referred to herein as computing devices 1106) can communicate with the computing environment 1102 via the network 1104. In one illustrated configuration, the clients 1106 include a computing device 1106A such as a laptop computer, a desktop computer, or other computing device; a slate or tablet computing device ("tablet computing device") 1106B; a mobile computing device 1106C such as a mobile telephone, a smart phone, or other mobile computing device; a server computer 1106D; and/or other devices 1106N. It should be understood that any number of clients 1106 can communicate with the computing environment 1102.

In various examples, the computing environment 1102 includes servers 1108, data storage 1110, and one or more network interfaces 1112. The servers 1108 can host various services, virtual machines, portals, and/or other resources. In the illustrated configuration, the servers 1108 host virtual machines 1114, Web portals 1116, mailbox services 1118, storage services 1120, and/or, social networking services 1122. As shown in FIG. 11, the servers 1108 also can host other services, applications, portals, and/or other resources ("other resources") 1124. The other resources 1124 may include the dynamic DNN 102 as well as any of the modules used for training or implementing the DNN 102.

As mentioned above, the computing environment 1102 can include the data storage 1110. According to various implementations, the functionality of the data storage 1110 is provided by one or more databases operating on, or in communication with, the network 1104. The functionality of the data storage 1110 also can be provided by one or more servers configured to host data for the computing environment 1100. The data storage 1110 can include, host, or provide one or more real or virtual datastores 1126A-1126N (hereinafter referred to collectively and/or generically as "datastores 1126"). The datastores 1126 are configured to host data used or created by the servers 1108 and/or other data. That is, the datastores 1126 also can host or store web page documents, word documents, presentation documents, data structures, algorithms for execution by a recommendation engine, and/or other data utilized by any application program. Aspects of the datastores 1126 may be associated with a service for storing files.

The computing environment 1102 can communicate with, or be accessed by, the network interfaces 1112. The network interfaces 1112 can include various types of network hardware and software for supporting communications between two or more computing devices including the computing devices and the servers. It should be appreciated that the network interfaces 1112 also may be utilized to connect to other types of networks and/or computer systems.

It should be understood that the distributed computing environment 1100 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1100 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 1100 to utilize the functionality described herein for providing the techniques disclosed herein, among other aspects.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A system comprising: a processing unit (1002); and a computer-readable medium (1012) having encoded thereon instructions, that when executed by the processing unit, cause the system to: generate a soil embedding (202) from soil features (104) processed through a soil module (604) that comprises a first neural network (200); generate a weather embedding (402) from weather features (106) processed through a weather module (608) that comprises a second neural network (400); generate a field management embedding (302) from field management features (108) processed through a field management module (606) that comprises a third neural network (300); generate a variety (e.g., genome) embedding (502) from crop variety (e.g., genome) features (110) processed through a crop variety module (610) that comprises a fourth neural network (400); concatenate by a fusion module (616) the soil embedding, the field management embedding, the weather embedding, and the variety embedding and provide to a deep neural network (DNN) (102); and receive from the DNN a predicted value for the crop characteristic (e.g., phenotype) (112) of the crop variety.

Clause 2. The system of clause 1, wherein the instructions further cause the system to generate a variety-weather embedding by combining the variety embedding and the weather embedding with cross attention in a cross attention module and wherein the fusion module concatenates the variety-weather embedding with the soil embedding, the field management embedding, and the weather embedding.

Clause 3. The system of any of clauses 1 or 2, wherein at least one of the first neural network, second neural network, third neural network, and fourth neural network is a convolutional neural network (CNN) and at least one is a fully-connected neural network.

Clause 4. The system of clauses 1 to 3, wherein the soil features include a percentage of clay, percentage of sand, percentage of silt, percentage of organic matter, calcium content, magnesium content, phosphorus content, nitrate content, potassium content, sodium content, sulfate content, pH, soil conductivity, percentage of calcium saturation, percentage of hydrogen saturation, percentage of potassium saturation, percentage of magnesium saturation, and percentage of sodium saturation, and the first neural network is a fully connected neural network with at least two hidden layers.

Clause 5. The system of any of clauses 1 to 4, wherein the field management features use of irrigation, irrigation amount, planting density, total amount of nitrogen (N) fertilizer, total amount of phosphorus (P) fertilizer, and total amount of potassium (K fertilizer and the second neural network is a fully connected neural network with at least two hidden layers.

Clause 6. The system of any of clauses 1 to 5, wherein the weather features are a timeseries including solar radiation, vapor pressure, dewpoint, precipitation, maximum temperature, minimum temperature, wind speed, relative humidity, dewpoint, day length, and growing degree days (GDD) and the third neural network is a convolutional neural network (CNN) with at least two convolutional layers.

Clause 7. The system of any of clauses 1 to 6, wherein the crop variety features comprise the genome of the crop variety and the fourth neural network is a CNN.

Clause 8. The system of any of clauses 1 to 7, wherein the crop characteristic of the crop variety is one of grain yield, protein content, moisture content, fiber content, height, drought resistance, molecular or metabolic characteristic, and disease resistance.

Clause 9. The system of any of clauses 1 to 8, wherein the genome of the crop variety is represented as a series of single nucleotide polymorphisms (SNPs).

Clause 10. The system of clause 9, wherein the SNPs included in the features of the crop variety are a subset of the SNPs present in a genome of the crop variety, the subset of SNPs selected by mutual information.

Clause 11. The system of clause 9, wherein the SNPs are represented as matrices that include vector representations of nucleotides in the SNPs.

Clause 12. The system of clause 11, wherein the matrices representing the SNPs include a vector representation of at least one nucleotide adjacent to the SNP locations.

Clause 13. The method of clause 9, wherein the features of the first crop variety are a series of single nucleotide polymorphisms (SNPs) found in the genome of the first crop variety and the features of the second crop variety are a series of SNPs found in the genome of the second crop variety.

Clause 14. A method comprising: obtaining soil features (104) and weather features (106) for a field; identifying a field management technique; receiving an indication of a first crop variety; generating embeddings (202, 302, 402, 502) using neural networks (200, 300, 400, 500) from the soil features, the weather features, field management features of the field management technique, and features of the crop variety; providing a concatenation of the embeddings to a deep neural network (DNN) (102) trained to predict a value for a crop characteristic (e.g., phenotype); receiving a predicted value for the crop characteristic (112) of the crop variety from the DNN; repeating operations c-f with a second crop variety; selecting either the first crop variety or the second crop variety as a selected crop variety based on the respective predicted values for the crop characteristic; and planting the selected crop variety in the field.

Clause 15. The method of clause 14, wherein a soil embedding is created from the soil features by a first neural network, a weather embedding is created from the weather features by a second neural network, a field management embedding is created from the field management features by a third neural network, and a crop variety embedding is created from the features of the crop variety by a fourth neural network.

Clause 16. The method of clause 15, wherein the first neural network is a fully-connected neural network, the second neural network is a CNN, the third neural network is a fully-connected neural network, and the fourth neural network is a CNN.

Clause 17. The method of any of clauses 15 or 16, further comprising creating a variety-weather embedding by combining the variety embedding and the weather embedding with cross attention and wherein concatenating the embeddings comprises concatenating the soil embedding, the field management embedding, the weather embedding, and the variety-weather embedding.

Clause 18. The method of any of clauses 15 to 17, wherein during repetition of operations c-f with the second crop variety the soil embedding, the weather embedding, and the field management embedding are reused.

Clause 19. The method of any of clauses 14 to 18, wherein a plurality of field management techniques are identified and further comprising: after choosing the selected crop variety, repeating operations b-f with each of the plurality of field management techniques; selecting a one of the plurality of field management techniques based on the predicted values for the crop characteristic; and managing the selected crop variety after planting according to the selected one of the field management techniques.

Clause 20. A method comprising: obtaining soil features (104) and weather features (106) for a field; receiving an indication of a crop variety (e.g., genome) planted in the field; identifying a first field management technique; generating embeddings (202, 302, 402, 502) using neural networks (200, 300, 400, 500) from the soil features, the weather features, the crop variety features (11), and field management features (108) of the field management technique; providing a concatenation of the embeddings to a deep neural network (DNN) (102) trained to predict a value for a crop characteristic (e.g., phenotype); receiving a predicted value for the crop characteristic (112) of the crop variety from the DNN; repeating operations c-f with a second field management technique; selecting either the first field management technique or the second field management technique as a selected field management technique based on the respective predicted values for the crop characteristic; and managing the crop variety according to the selected field management technique.

Clause 21. The method of clause 20, wherein the field management features include at least one of use of irrigation, irrigation amount, planting density, total amount of nitrogen (N) fertilizer, total amount of phosphorus (P) fertilizer, and total amount of potassium (K fertilizer.

Clause 22. The method of any of clauses 20 or 21, wherein a soil embedding is created from the soil features by a first neural network, a weather embedding is created from the weather features by a second neural network, a field management embedding is created from the field management features by a third neural network, and a variety embedding is created from features of the crop variety by a fourth neural network.

Clause 23. The method of clause 22, wherein the first neural network is a fully-connected neural network, the second neural network is a CNN, the third neural network is a fully-connected neural network, and the fourth neural network is a CNN.

Clause 24. The method of any of clauses 22 or 23, further comprising creating a variety-weather embedding by combining the variety embedding and the weather embedding with cross attention and wherein concatenating the embeddings comprises concatenating the soil embedding, the field management embedding, the weather embedding, and the variety-weather embedding.

Clause 25. The method of any of clauses 20 to 24, further comprising: creating updated weather features from actual weather data for a first part of the growing season and predicted weather data for a second part of the growing season; repeating operations c-i with the updated weather features.

CONCLUSION

While certain example embodiments have been described, including the best mode known to the inventors for carrying out the invention, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different sensors).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

The invention claimed is:

1. A system comprising:
  a processing unit; and
  a computer-readable medium having encoded thereon instructions, that when executed by the processing unit, cause the system to:
    generate a soil embedding from soil features processed through a soil module that comprises a first neural network;
    generate a weather embedding from weather features processed through a weather module that comprises a second neural network;
    generate a field management embedding from field management features processed through a field management module that comprises a third neural network;
    generate a crop variety embedding from crop variety features processed through a crop variety module that comprises a fourth neural network;
    generate a variety-weather embedding by combining the variety embedding and the weather embedding with cross attention in a cross attention module;

concatenate by a fusion module the soil embedding, the field management embedding, the weather embedding, and the crop variety embedding and provide to a deep neural network (DNN), and wherein the fusion module concatenates the variety-weather embedding with the soil embedding, the field management embedding, and the weather embedding;

receive from the DNN a predicted value for a crop characteristic of the crop variety; and (i) selecting and planting a crop variety based on the predicted value for the crop characteristic or (ii) selecting and implementing a field management technique based on the predicted value for the crop characteristic.

2. The system of claim 1, wherein at least one of the first neural network, second neural network, third neural network, and fourth neural network is a convolutional neural network (CNN) and at least one is a fully-connected neural network.

3. The system of claim 1, wherein the soil features include a percentage of clay, percentage of sand, percentage of silt, percentage of organic matter, calcium content, magnesium content, phosphorus content, nitrate content, potassium content, sodium content, sulfate content, pH, soil conductivity, percentage of calcium saturation, percentage of hydrogen saturation, percentage of potassium saturation, percentage of magnesium saturation, and percentage of sodium saturation and the first neural network is a fully connected neural network with at least two hidden layers.

4. The system of claim 1, wherein the field management features use of irrigation, irrigation amount, planting density, total amount of nitrogen (N) fertilizer, total amount of phosphorus (P) fertilizer, and total amount of potassium (K) fertilizer and the second neural network is a fully connected neural network with at least two hidden layers.

5. The system of claim 1, wherein the weather features are a timeseries including solar radiation, vapor pressure, dewpoint, precipitation, maximum temperature, minimum temperature, wind speed, relative humidity, dewpoint, day length, and growing degree days (GDD) and the third neural network is a convolutional neural network (CNN) with at least two convolutional layers.

6. The system of claim 1, wherein the crop variety features comprise the genome of the crop variety and the fourth neural network is a CNN.

7. The system of claim 1, wherein the crop characteristic of the crop variety is one of grain yield, protein content, moisture content, fiber content, height, drought resistance, molecular or metabolic characteristic, and disease resistance.

8. The method of claim 1, wherein the cross attention is a technique that combines two separate embedding sequences asymmetrically at the same dimension, involving a cell in one embedding attending to all cells in another embedding.

9. A method comprising:
a) obtaining soil features and weather features for a field;
b) identifying a field management technique;
c) receiving an indication of a first crop variety;
d) generating, using neural networks, embeddings from the soil features, the weather features, field management features of the field management technique, and features of the first crop variety;
e) providing a concatenation of the embeddings to a deep neural network (DNN) trained to predict a value for a crop characteristic;
f) receiving a predicted value for the crop characteristic of the crop variety from the DNN;
g) repeating operations c-f with a second crop variety;
h) selecting either the first crop variety or the second crop variety as a selected crop variety based on the respective predicted values for the crop characteristic; and
i) planting the selected crop variety in the field.

10. The method of claim 9, wherein a soil embedding is created from the soil features by a first neural network, a weather embedding is created from the weather features by a second neural network, a field management embedding is created from the field management features by a third neural network, and a crop variety embedding is created from the features of the crop variety by a fourth neural network.

11. The method of claim 10, wherein the first neural network is a fully-connected neural network, the second neural network is a CNN, the third neural network is a fully-connected neural network, and the fourth neural network is a CNN.

12. The method of claim 10, further comprising creating a variety-weather embedding by combining the variety embedding and the weather embedding with cross attention and wherein concatenating the embeddings comprises concatenating the soil embedding, the field management embedding, the weather embedding, and the variety-weather embedding.

13. The method of claim 10, wherein during repetition of operations c-f with the second crop variety the soil embedding, the weather embedding, and the field management embedding are reused.

14. The method of claim 9, wherein a plurality of field management techniques are identified and further comprising:
after choosing the selected crop variety, repeating operations b-f with each of the plurality of field management techniques;
selecting a one of the plurality of field management techniques based on the predicted values for the crop characteristic; and
managing the selected crop variety after planting according to the selected one of the field management techniques.

15. A method comprising:
a) obtaining soil features and weather features for a field;
b) receiving an indication of a crop variety planted in the field;
c) identifying a first field management technique;
d) generating embeddings using neural networks from the soil features, the weather features, features of the crop variety, and field management features of the field management technique;
e) providing a concatenation of the embeddings to a deep neural network (DNN) trained to predict a value for a characteristic of the crop variety;
f) receiving a predicted value for the characteristic of the crop variety from the DNN;
g) repeating operations c-f with a second field management technique;
h) selecting either the first field management technique or the second field management technique as a selected field management technique based on the respective predicted values for the characteristic; and
i) managing the crop variety according to the selected field management technique.

16. The method of claim 15, wherein the field management features include at least one of use of irrigation, irrigation amount, planting density, total amount of nitrogen (N) fertilizer, total amount of phosphorus (P) fertilizer, and total amount of potassium (K) fertilizer.

17. The method of claim 15, wherein a soil embedding is created from the soil features by a first neural network, a weather embedding is created from the weather features by a second neural network, a field management embedding is created from the field management features by a third neural network, and a variety embedding is created from features of the crop variety by a fourth neural network.

18. The method of claim 17, further comprising creating a variety-weather embedding by combining the variety embedding and the weather embedding with cross attention and wherein concatenating the embeddings comprises concatenating the soil embedding, the field management embedding, the weather embedding, and the variety-weather embedding.

19. The method of claim 15, further comprising:
creating updated weather features from actual weather data for a first part of a growing season and predicted weather data for a second part of the growing season; and
repeating operations c-i with the updated weather features.

\* \* \* \* \*